(12) United States Patent
Mejias et al.

(10) Patent No.: US 7,175,074 B2
(45) Date of Patent: Feb. 13, 2007

(54) METHODS AND APPARATUS FOR PROCESSING ELECTRONIC CHECKS

(75) Inventors: Brian Mejias, Howard Beach, NY (US); Thomas G. Cain, West Haven, CT (US); Garret English, Stormville, NY (US); Leonard DeCaro, Ansonia, CT (US)

(73) Assignee: CheckFree Services Corporation, Norcross, GA (US)

( * ) Notice: Subject to any disclaimer, the term of this patent is extended or adjusted under 35 U.S.C. 154(b) by 144 days.

(21) Appl. No.: 10/925,592

(22) Filed: Aug. 25, 2004

(65) Prior Publication Data

US 2006/0049242 A1 Mar. 9, 2006

(51) Int. Cl.
G07F 19/00 (2006.01)

(52) U.S. Cl. ............... 235/379; 235/380; 235/382; 705/49

(58) Field of Classification Search .......... 235/379, 235/382; 705/45
See application file for complete search history.

(56) References Cited

U.S. PATENT DOCUMENTS

| | | | |
|---|---|---|---|
| 6,006,208 A * | 12/1999 | Forst et al. ............... 705/39 |
| 6,389,541 B1 * | 5/2002 | Patterson ................. 726/9 |
| 6,760,470 B1 * | 7/2004 | Bogosian et al. ......... 382/139 |
| 6,769,615 B2 * | 8/2004 | Resseguie ............... 235/449 |
| 2003/0130950 A1 * | 7/2003 | Ahles ..................... 705/45 |

* cited by examiner

Primary Examiner—Seung Ho Lee
(74) Attorney, Agent, or Firm—Sutherland Asbill & Brennan LLP

(57) ABSTRACT

Methods according to the invention include accepting e-check data input from a payer, parsing the data to determine the bank routing number and the ostensible checking account number, determining the correct number of checking account digits based on the bank routing number, determining whether the ostensible checking account number has the correct number of digits, and prompting the payer to re-enter the checking account number with the correct number of digits if necessary. In addition, the methods include automatically pre-pending and/or appending zero digits where necessary to correct the number of digits in the checking account number. In cases where the payer includes the check number as part of the account number, the methods include removing the check number from the account number by prompting the payer to enter the check number so that it can be deleted from the account number. The methods also reduce NSF returns by comparing account numbers to a negative list to determine whether the account has a history of NSF returns and by automatically re-presenting NSF returns on the next four business days following the return.

49 Claims, 22 Drawing Sheets

Fuzzy ABA Function  Figure 5

Process Checking Account Information  Figure 6

Process Fields : Two Fields

Echeck Server ABA VALIDATION ROUTINE  Figure 13

Erroneous Checking Account — Figure 15

Flow Chart For Payment Processing

Flow Chart For Bank Processing

Fig. 19

PAY TO THE
ORDER OF

DATE:

$

3317

DOLLARS

MEMO

PAY TO THE
ORDER OF

DATE:

$

DOLLARS

MEMO

0123

⑈013456741916⑈' ⑆031411335⑈' 0123 ly, the invention relates to methods and apparatus for
METHODS AND APPARATUS FOR PROCESSING ELECTRONIC CHECKS

BACKGROUND OF THE INVENTION

1. Field of the Invention

The invention relates to electronic checks. More particularly, the invention relates to methods and apparatus for processing electronic checks to minimize the number of returned electronic checks.

2. Brief Description of the Prior Art

All bank checks are encoded with information which allows for machine processing of the check. This information is printed at the bottom of the check starting in the lower left hand corner and often extending under the signature line. This line of printed information is referred to as the MICR (magnetic ink character recognition) line. Prior to writing the check, the line of information includes the bank routing number (ABA number), the checking account number, and the check number. After the check is written and presented for payment, the check is read by a human and the amount of the check is imprinted on the MICR line to the right of the other information. From that point on, the check is processed by machine.

An electronic check or "e-check" is like a check without the paper. The drawer or maker of the check provides the necessary information from the check, but not the paper. This can be accomplished in several ways. One popular way is referred to as electronic check conversion. Here, the drawer or maker of the check provides a void blank check which is scanned to obtain all of the information except for the payment amount which is then entered via a keyboard or keypad. Another method is to enter all of the information via a keyboard or keypad. The latter method is used when payment is made by telephone or via the Internet. In telephone payment methods, the check information is usually obtained via an interactive voice response unit (IVRU) which plays pre-recorded prompts and interprets DTMF (dual tone multi-frequency) signals generated by the telephone keypad.

E-checks are commonly used in situations where the payer chooses not to use a credit card (e.g. does not have a credit card) or where the payee chooses not to accept a credit card. E-checks are processed in the same manner as paper checks which have been fully encoded and machine read. The information is compared to databases to determine whether the checking account can be identified and whether the checking account has sufficient funds to pay the check. If either of these inquiries fail, the check (paper or e-check) is "returned" to the presenter (usually the payee). If the account has insufficient funds to pay the check, the return is referred to as an NSF (not sufficient funds) return. If the account can not be identified, the return is referred to as an administrative (ADM) return. A little over 1% of paper checks are returned, mainly NSF returns. E-checks have a much higher return rate (e.g. 4.7%) than paper checks and this is mainly due to ADM returns.

The high administrative return rate of e-checks is mostly due to human error on the part of the payer (check drawer). Although the MICR line information is standardized, the standardization only lends itself to optical reading and character recognition. It is not positional and the characters denoting a field are unknown to a person so the standard cannot be used when optical reading equipment is unavailable. There are also optional fields on some checks and this may confuse the payer when attempting to read the MICR line. Often a payer will enter too many or too few digits. In addition, a phenomenon known in the art as "fat fingers" causes erroneous keypad and keyboard entries (typographical errors). These errors are usually associated with the account identification information rather than the payment amount data. It is estimated that two thirds of e-check returns are administrative returns. Prior art FIGS. 19–22 illustrate how the MICR line may appear on a business check (FIG. 19) or on a personal check (FIGS. 20–22).

The high rate of e-check returns is a significant problem for businesses that rely heavily on e-check payments, such as utility companies. A typical utility company may have approximately one million customers who pay their monthly bill by e-check. With an e-check return rate of 4.7%, that means that 47,000 customer payments will be rejected every month. This causes an immediate cash-flow problem for the company but also causes a very expensive customer relations problem. Most of the 47,000 customers will need to speak to a customer service representative to correct the situation. At a conservative estimate of $10 per customer service call, this will add nearly half a million dollars to the company's monthly operating expenses.

State of the art systems for processing e-checks include TeleCheck® by TeleCheck Services, Inc., Houston, Tex., and StarCheck® by Concord EFS, Inc., Memphis, Tenn. These systems are primarily aimed toward reducing NSF returns and do not significantly reduce ADM returns. JP Morgan Chase maintains a data base system called "File-Fixer" which is purported to be able to reduce ADM returns, but thus far has been unable to reduce ADM returns at all. PhoneCharge, Inc. conducted an in house test and found that it did not reduce the admins, in fact it had a negative effect because valid checking accounts were locked making them ineligible for transaction processing.

SUMMARY OF THE INVENTION

It is therefore an object of the invention to provide methods and apparatus for processing e-checks.

It is also an object of the invention to provide methods and apparatus for processing e-checks which reduces the number of check returns.

It is another object of the invention to provide methods and apparatus for processing e-checks which reduces the number of ADM returns in addition to reducing the number of NSF returns.

In accord with these objects which will be discussed in detail below, the methods according to the invention include accepting e-check data input from a payer, parsing the data to determine the bank routing number and the ostensible checking account number, determining the correct number of checking account digits based on the bank routing number, determining whether the ostensible checking account number has the correct number of digits, and prompting the payer to re-enter the checking account number with the correct number of digits if necessary. The methods of the invention also reduce NSF returns by comparing account numbers to a negative list to determine whether the account has a history of NSF returns and by automatically re-presenting NSF returns on the fourth business day following the return.

A presently preferred embodiment of the methods of the invention is set forth in computer source code which, when programmed into a computer, form an apparatus according to the invention. The invention may be implemented in an interactive voice response (IVR) system or in a interactive website, or in any other interactive system where the user is prompted to input data through a series of questions/prompts.

BRIEF DESCRIPTION OF THE DRAWINGS

FIGS. 19–22 illustrate a prior art business check and three personal checks.

BRIEF DESCRIPTION OF THE APPENDIX

Figure 1:
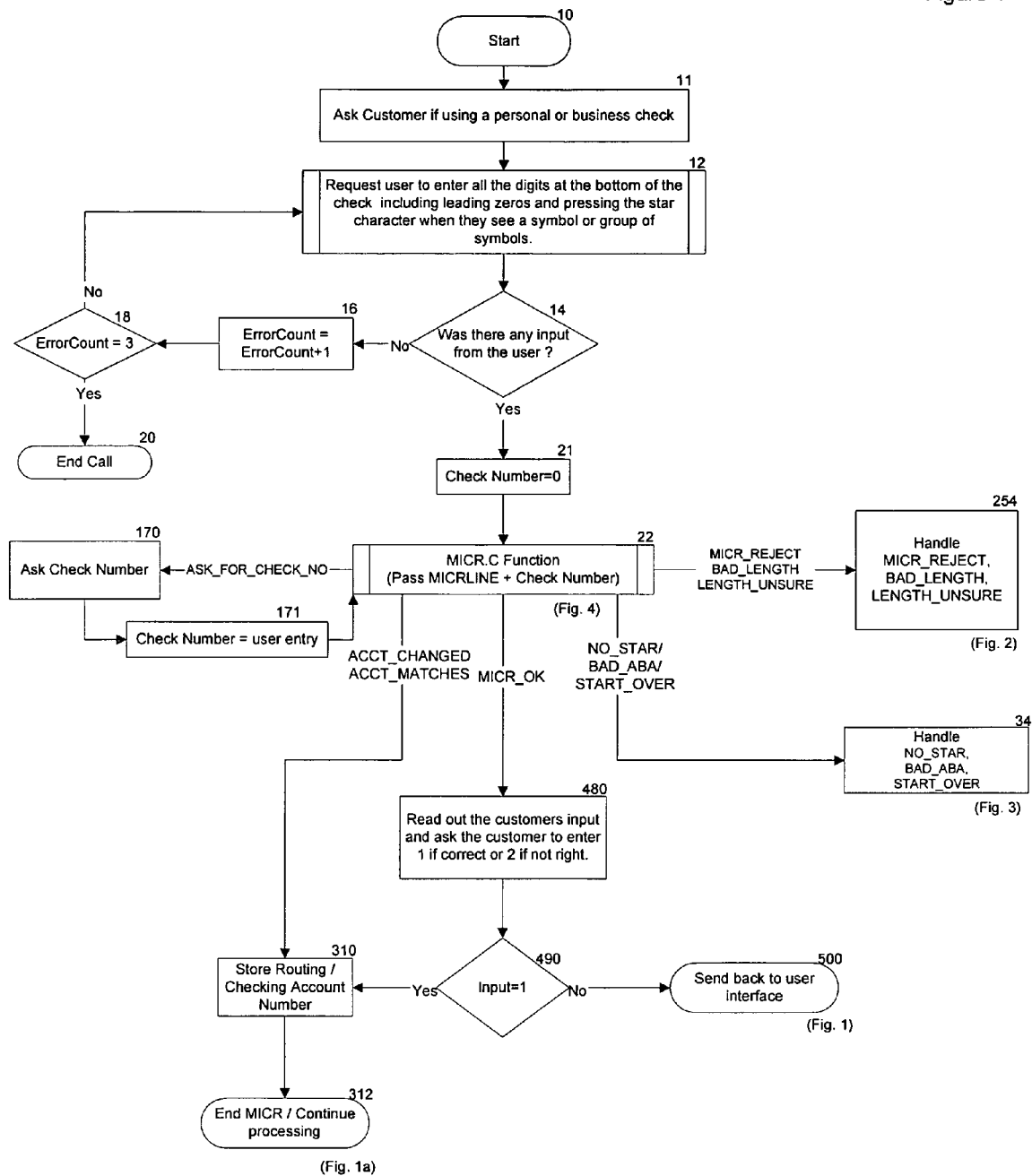
FIG. 1 is a high level flow chart illustrating a basic user interface according to the invention.

The attached CDROM ROM is in ISO 9660 Macintosh® format and includes the following ASCII files:

| List of files | Size (Bytes) | Date of Creation |
|---|---|---|
| micr.h | 2,303 | Dec. 26, 2003 |
| micr.c | 60,047 | Dec. 26, 2003 |
| micrscri.txt | 3,857 | Apr. 26, 2004 |
| negative.c | 7,941 | Apr. 16, 2004 |

The file micr.h is a standard C code header defining structures used in the main code. The file micr.c is the main code. The file micrscri.txt is an exemplary IVR script for utilizing the invention. The file negative.c is source code to perform the ABA checksum routine described in the drawings.

DETAILED DESCRIPTION

The invention is most easily understood by reference to the flow charts rather than the C code. Reference to the code will be made where possible when explaining the flow charts. It will be appreciated, however, that the flow charts do not directly correspond to the C code.

Turning now to FIG. 1, the main user interface starts at 10 and first requests at 11 that the customer indicate whether the payment will be made with a business account or a personal account. As used herein, the terms user and customer are the payor and the term client is the payee. At 12 it is requested that the user enter all the digits at the bottom of the check including leading zeros (i.e. the MICR line data) and to press the star character (*) for each symbol or group of symbols. The routine at 14–20 causes the session to end if the user does not enter any data after three prompts. It will be appreciated that the decision at 14 will be linked to a timer (not shown) so that the user is given sufficient time to enter data. Once it is determined at 14 that the user has entered data, the variable Check Number is set to zero at 21 and the function MICR.C is called at 22. This function is outlined in FIG. 4. The user interface is typically part of the IVR system or other system used to acquire other data from the customer. An exemplary system is described below with reference to FIG. 18.

Figure 3:
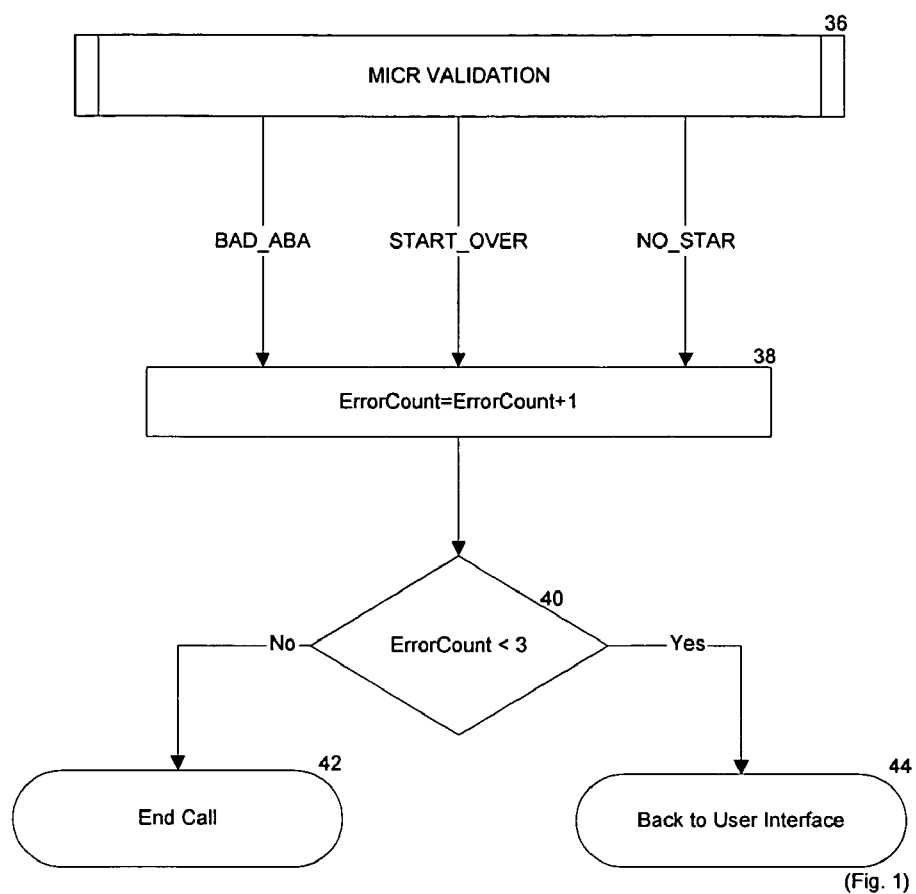
FIG. 3 is a high level flow chart illustrating a sub-routine for handling ABA number problems.
Figure 4:
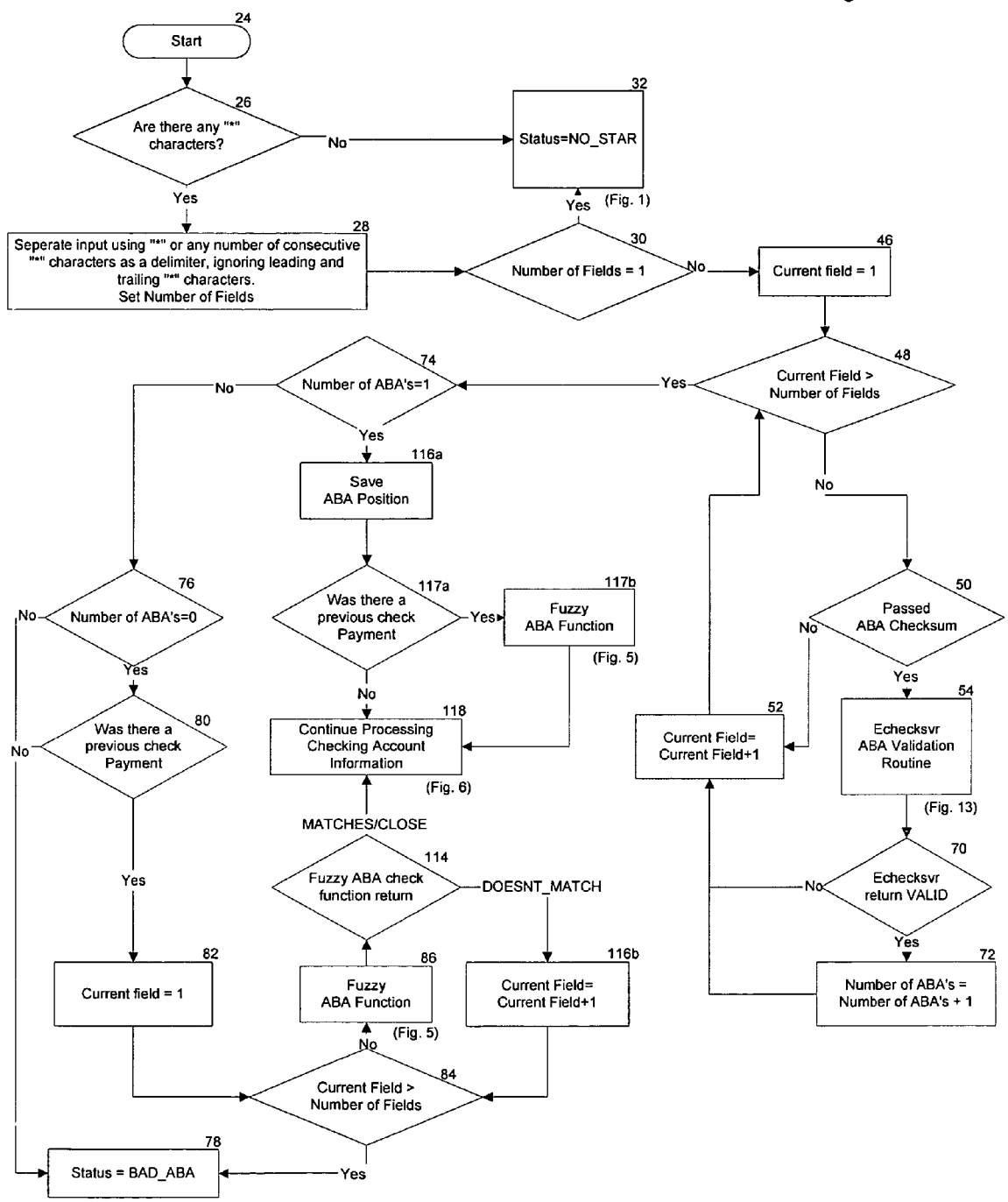
FIG. 4 is a high level flow chart illustrating a sub-routine for parsing MICR numbers.

Turning now to FIG. 4, starting at 24, it is determined at 26 whether the user input includes any star characters. If there are one or more star characters present, they are used at 28 to determine the number of fields by treating any one or more consecutive star characters as field delimiters. After processing at 28, it is determined at 30 whether there are more than one field. If there is only one field or if there were no star characters, the NO_STAR flag is set at 32 and the processing returns to FIG. 1 where further processing is directed to a handler invoked at 34 in FIG. 1 for handling the flags NO_STAR, BAD_ABA, and START_OVER. This handler is outlined in FIG. 3. The functions of FIG. 4 can be found in the code at micr_split, analyze_micr, and validate_check_lengths.

Referring now to FIG. 3, the handling of the flags NO_STAR, BAD_ABA, and START_OVER begins at 36 and increments an error count at 38. If it is determined at 40 that the error count is greater than or equal to three, the session is ended at 42. So long as the error count is less than three, the process resumes at 44 being directed back to FIG. 1 at the start 10 and re-prompts the user to re-enter the digits.

Returning to FIG. 4, if it is determined at 30 that there are more than one field in the data entered by the user, the first field is selected at 46 (reading the fields from left to right). At 48 it is determined whether all of the fields have been considered. During the first pass through 48, the answer will be no. At 50 it is determined whether the data in the field currently being considered passed the ABA checksum. The source code for making this determination is provided in the Appendix. If the checksum does not pass, the next field is selected at 52 and the process continues through 48 and 50 until a field passes the ABA checksum at 50 or it is determined at 48 that all fields have been checked. If it is determined at 50 that the field data passes the ABA checksum, the Echeck Server ABA Validation routine is called at 54. This routine is outlined in FIG. 13.

Figure 13:
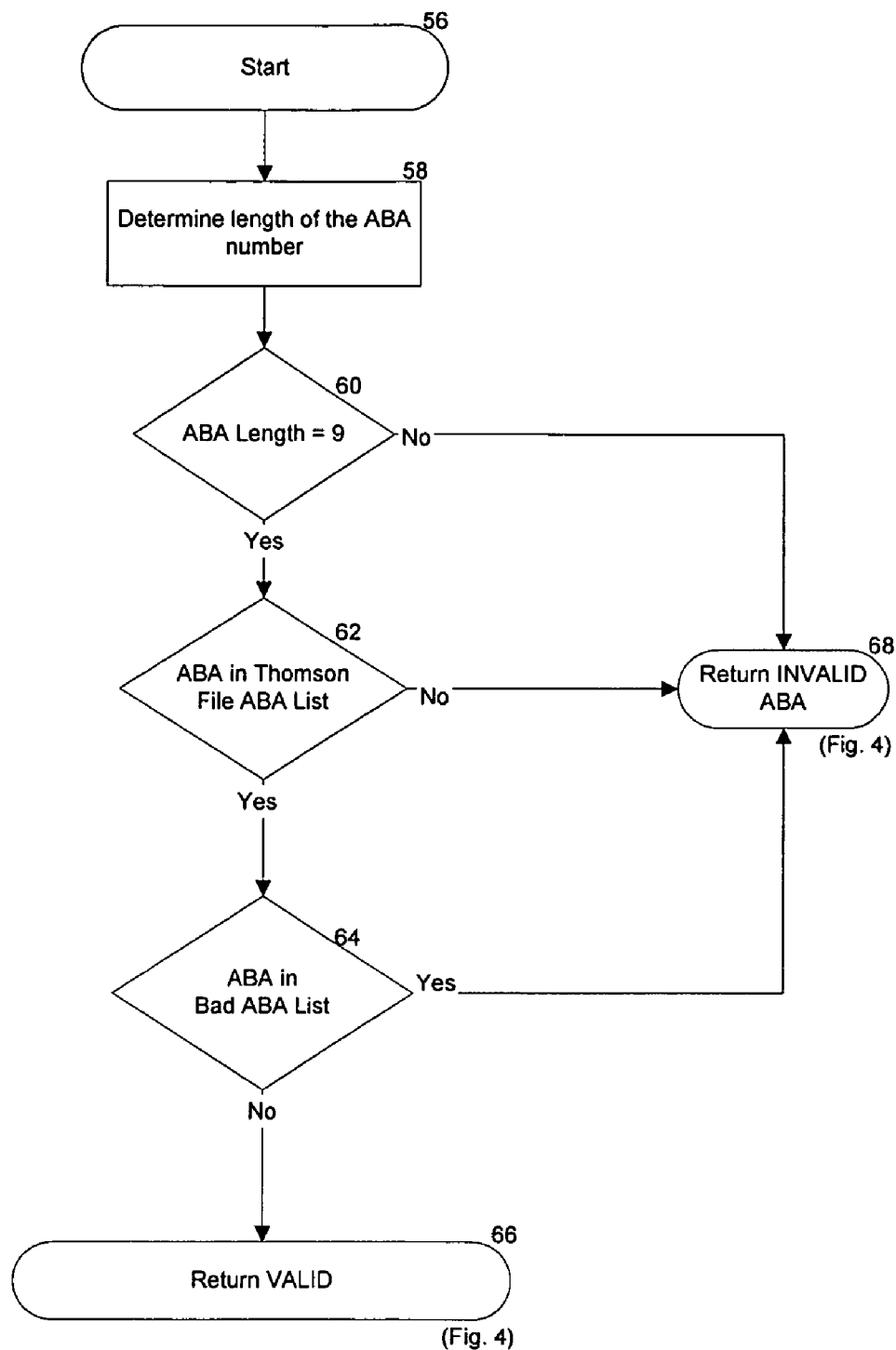
FIG. 13 is a high level flow chart illustrating a sub-routine for validating ABA numbers.

Starting at 56 in FIG. 13, the length of the ABA number is determined at 58. If the length is determined at 60 to be nine, processing continues at 62 to determine whether the ABA number is in the Thomson File ABA list. This file is available from Thomson Financial, Stamford, Conn. on a monthly subscription basis. If the number is found in the Thomson list, it is checked against a list of bad ABA numbers at 64. This list is created based on previous processing failures for this client. If it is not on the list of bad numbers, the routing ends at 66 with a VALID response. If any of the three tests fails, the routine ends at 68 with a BAD ABA response. In either case, processing returns to 70 in FIG. 4.

If a Valid response is returned to 70 in FIG. 4, the variable "Number of ABAs" is incremented at 72. It will be appreciated that the first valid response will set this variable to one. The next field is set at 52 and the process continues to check all of the fields looking for fields that satisfy the checksum at 50. Each field that satisfies the ABA checksum is further investigated by the routine called at 54 and each time a field is found to be a valid ABA number, the variable "Number of ABAs" is incremented at 72. After all of the fields have been checked for ABA numbers, the process continues to 74 where the variable "Number of ABAs" is examined. If the number is not one, it is determined at 76 whether the number is zero. If it is not zero, i.e. if it appears that more than one ABA number was found, the function ends at 78 and sets the flag BAD_ABA. The process returns to FIG. 1 where the routine of FIG. 3 is called at 34.

If it is determined at 76 that no ABA numbers were found in the data entered by the customer, it is determined at 80 whether there was a pervious check payment by this user. This determination is made based on information obtained from an interactive payment system within which this invention is implemented. A suitable interactive payment system is described below with reference to FIG. 18. If there is no record of a previous payment, the function ends at 78. If it is determined at 80 that there was a previous payment, the first field is revisited at 82 and the function passes through 84 to call the Fuzzy ABA function at 86. This function is outlined in FIG. 5.

Still referring to FIG. 4, if it is determined at 74 that the number of ABAs is one, the ABA position is saved at 116a and it is determined at 117a whether there was a previous check payment. If there was, the fuzzy ABA function is called at 117b. If there was not, processing continues at 118 to FIG. 6.

Figure 5:
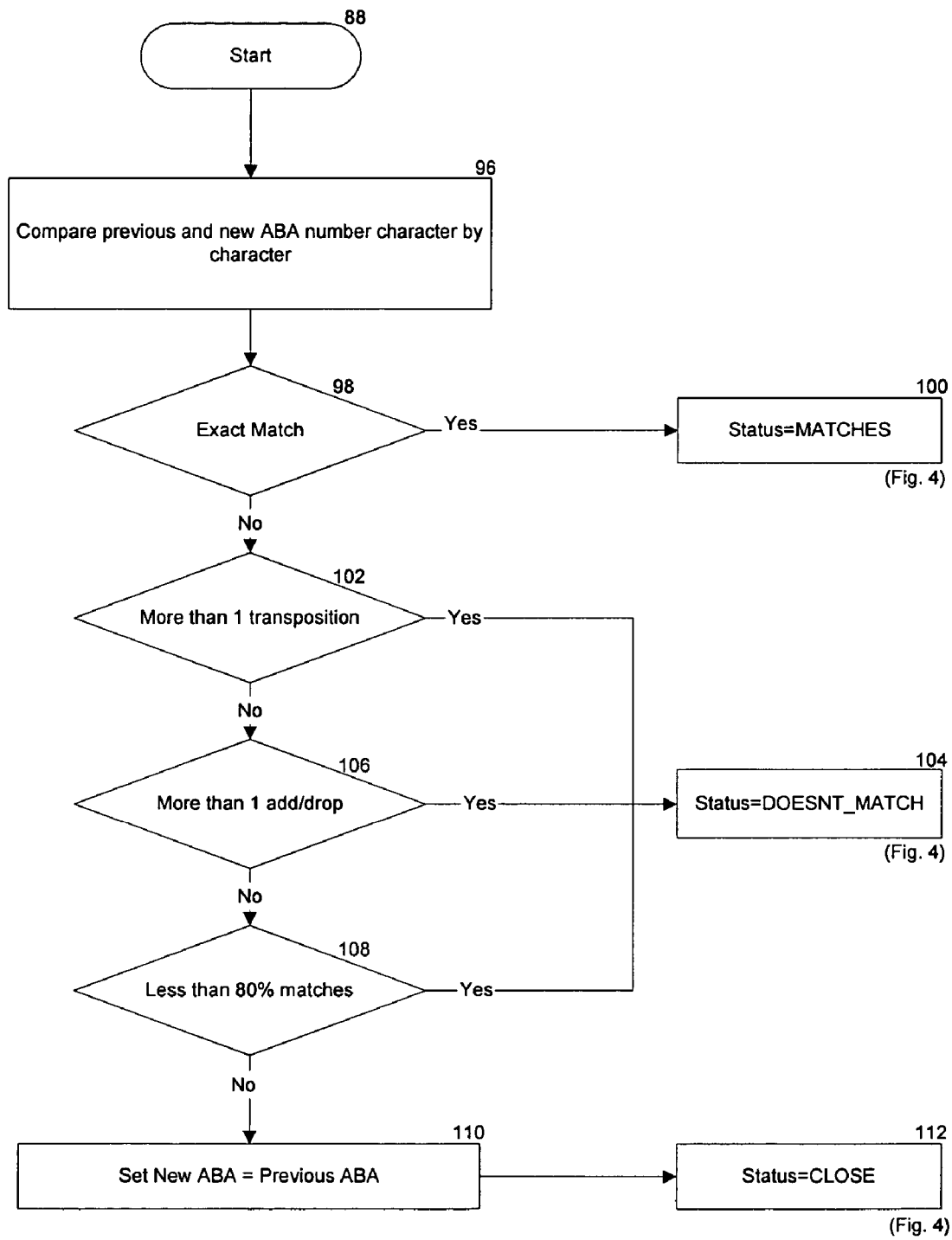
FIG. 5 is a high level flow chart illustrating a sub-routine for matching ABA numbers.

Turning now to FIG. 5, starting at 88, the previous and new ABA numbers are compared at 96. If it is determined at 98 that the numbers are an exact match, the MATCHES flag is set at 100. If it is determined at 102 that there is more than one transposition of numbers, the flag DOESN'T_MATCH is set at 104. If it is determined at 106 that the number of digits differ by more than one, the flag DOESN'T_MATCH is set at 104. If it is determined at 108 that less than 80% of the numbers match, the flag DOESN'T_MATCH is set at 104. If the tests at 102, 106 and 108 are all negative, the new ABA (i.e. the present ABA number) is set to be the same as the old ABA at 110 and the flag CLOSE is set at 112. After the appropriate flag is set, the function returns to the function of FIG. 4. The functions of FIG. 5 can be found in the code at fuzzy_aba and fuzzy_account.

The Fuzzy ABA function returns to 114 in FIG. 4 with the flag set. If the flag DOESN'T_MATCH is set, the next field is selected at 116b and the Fuzzy ABA function is repeated until all of the fields have been checked as determined at 84. If all of the fields result in DOESN'T_MATCH, the function ends at 78. If the MATCHES or CLOSE flags are set continued processing of the checking account information is called at 118.

Figure 6:
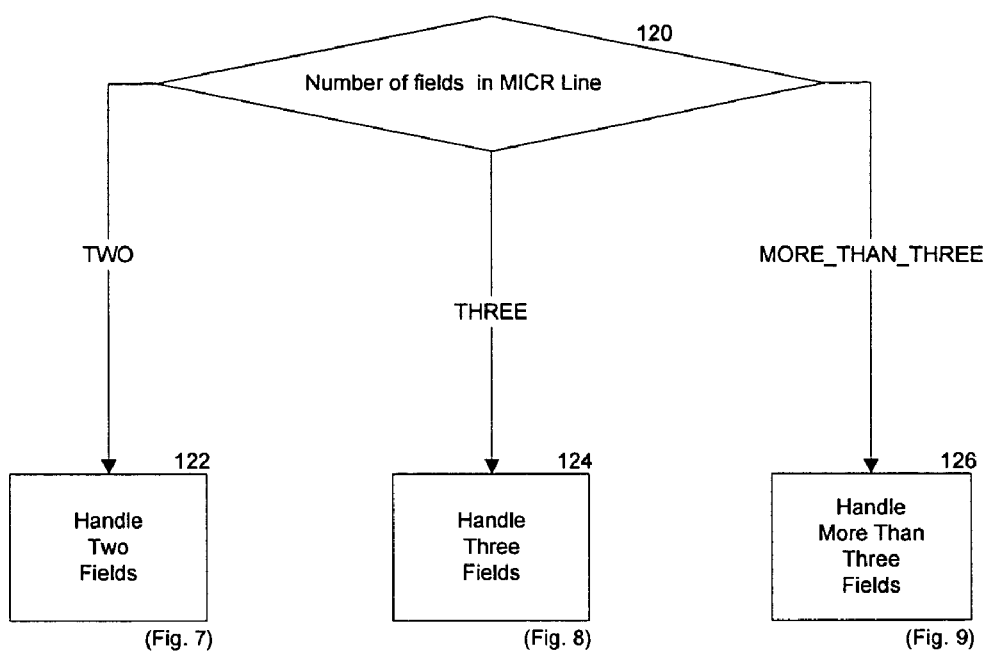
FIG. 6 is a high level flow chart illustrating a sub-routine for pre-handling checking account numbers.

Continued processing of checking account information begins as outlined in FIG. 6 where it is determined at 120 how many fields, including the ABA number, are in the user entered MICR line data. If there are two, a two field handling routine is called at 122. If there are three fields, a three field handler is called at 124. If there are more than three fields, a more than three field handler is called at 126. These respective handlers are outlined in FIGS. 7, 8, and 9, respectively. The functions of FIG. 6 can be found in the code at analyze_micr.

Figure 7:
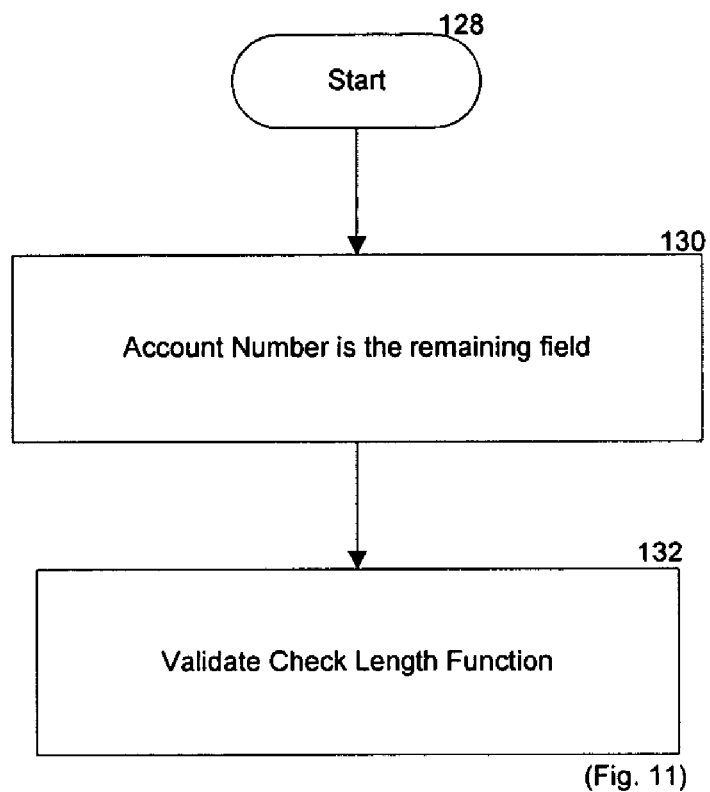
FIG. 7 is a high level flow chart illustrating a sub-routine for processing two field checking account numbers.

Referring now to FIG. 7, starting at 128, the account number is assumed to be the remaining field at 130 and the Validate Check (account number) Length function is called at 132. This function is described in detail below with reference to FIG. 11. The functions of FIG. 7 can be found in the code at analyze_micr.

Figure 8:
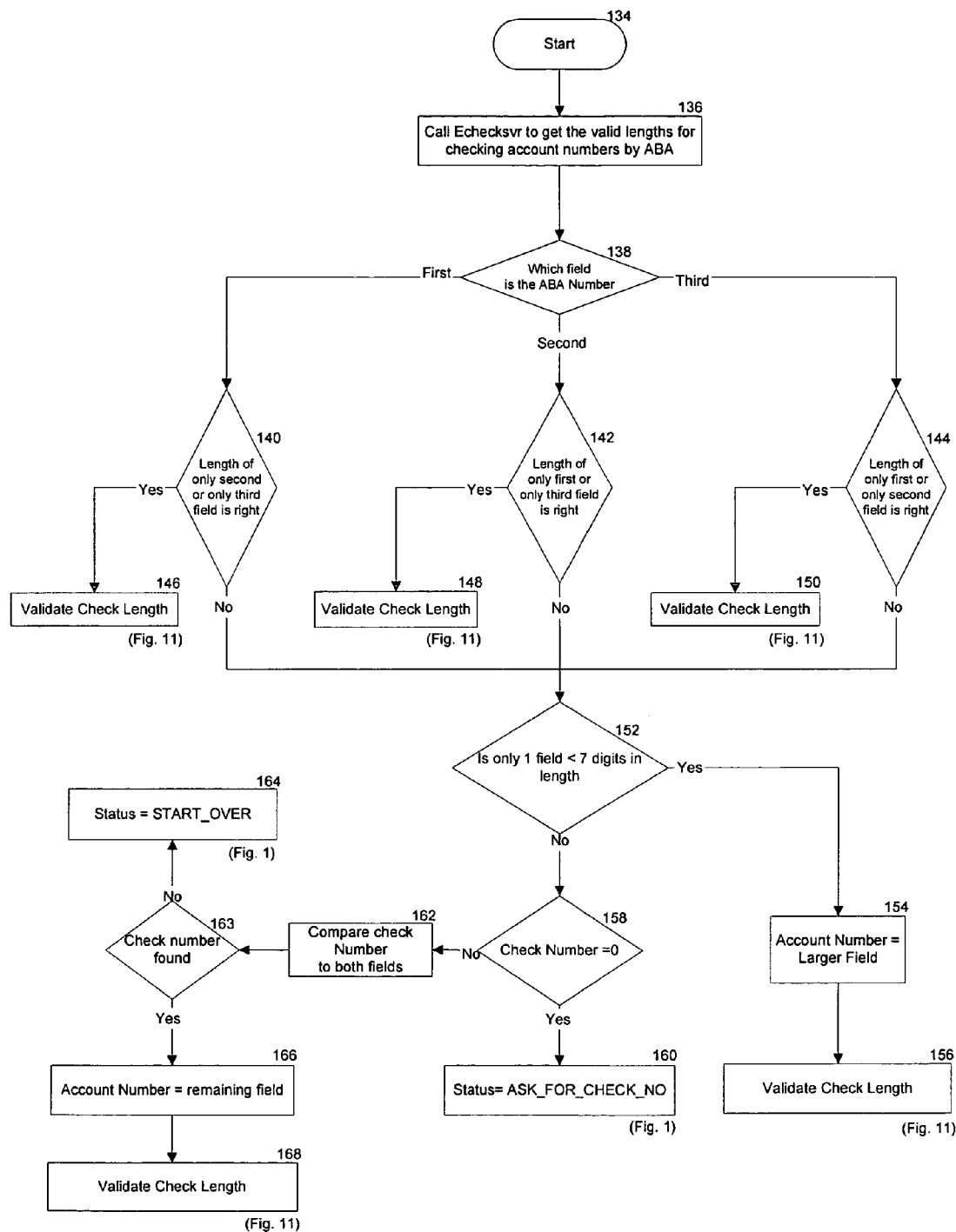
FIG. 8 is a high level flow chart illustrating a sub-routine for processing three field checking account numbers.

Turning to FIG. 8, starting at 134, the three field handler calls the Echeck Server at 136 to get the valid lengths for checking account numbers by ABA number. This routine is outlined in FIG. 14, described in detail below. The three field processing continues at 138 depending on which field is the ABA number. (See FIG. 4) In the case of the ABA number being the first field, the lengths of the second and third fields are compared at 140 to the correct length(s) which was obtained at 136. In the case of the ABA number being the second field, the lengths of the first and third fields are compared at 142 to the correct length which was obtained at 136. In the case of the ABA number being the third field, the lengths of the first and second fields are compared at 144 to the correct length which was obtained at 136. If it is determined that only one of these remaining fields has the correct length, the Validate Check Length function is called at 146, 148, or 150, respectively. This function is described in detail below with reference to FIG. 11.

If neither of the two remaining fields is the correct length as determined at 140, 142, or 144, it is then determined at 152 whether only one of the fields is less than seven digits. If only one field is less than seven digits in length, the account number is taken to be the longer field at 154 and the validate check length function is called at 156. This function is described in detail below with reference to FIG. 11.

If it is determined at 152 that both fields are less than seven digits or both are seven or more digits, it is then determined at 158 whether the check number is known. If the check number is not known, the flag ASK_FOR_CHECK_NO is set at 160 and the routine returns to 170 in FIG. 1 where the user is prompted to enter the check number and the variable "check number" is reset at 171. If it is determined at 158 that the check number is known, the check number is compared to both fields at 162 and it is determined at 163 whether the check number is found in one of the fields. If it is not, the flag START_OVER is set at 164 and the routine returns to the start 10 in FIG. 1. If it is determined at 163 that one of the fields is the check number, the account number is taken at 166 to be the other field and the validate check length function is called at 168. This function is described in detail below with reference to FIG. 11. The functions of FIG. 8 can be founding the code at try_combining.

Figure 9:
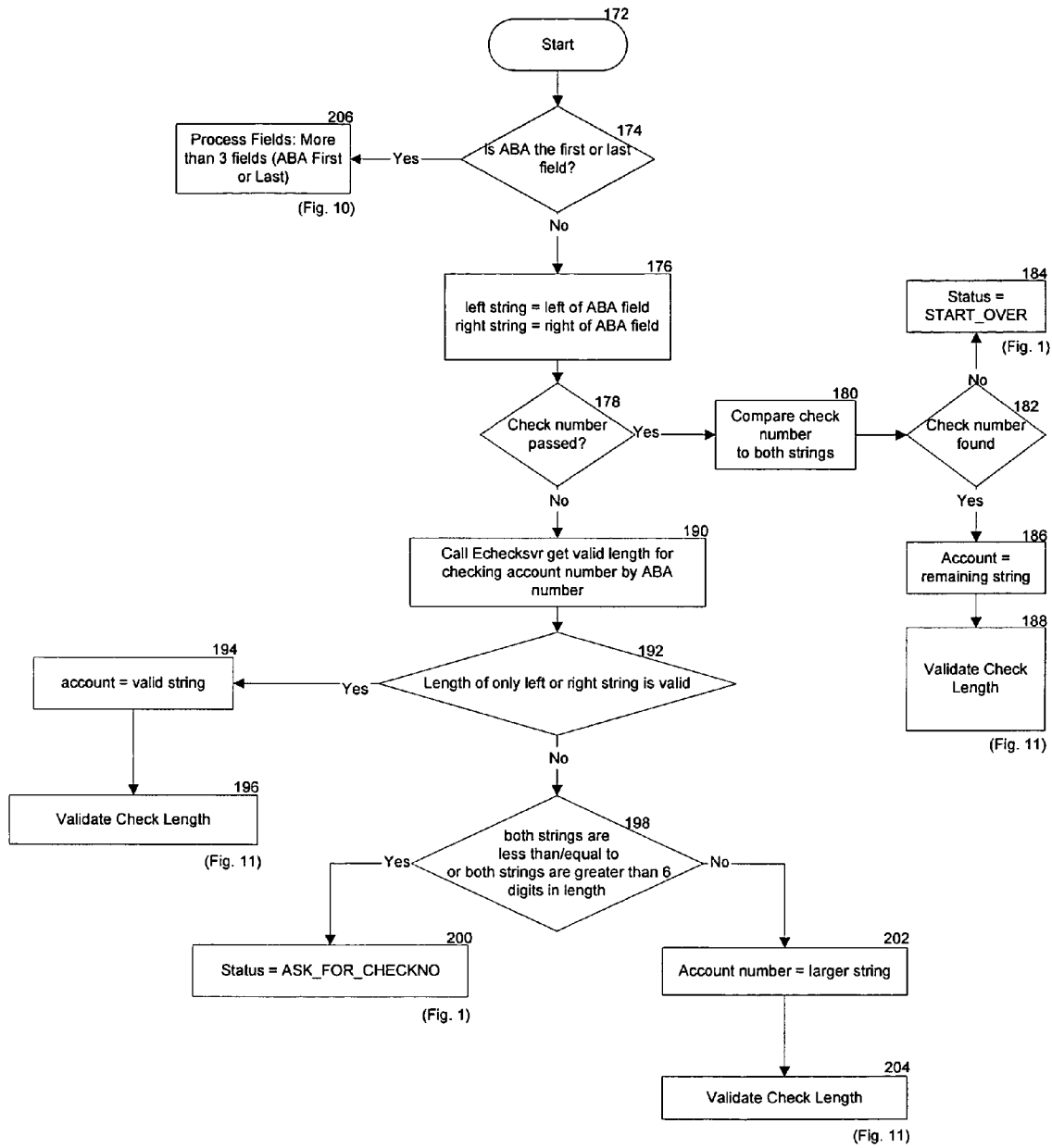
FIG. 9 is a high level flow chart illustrating a sub-routine for processing checking account numbers having more than three fields.

Turning now to FIG. 9, processing of a number having more than three fields begins at 172. It is first determined at 174 whether the ABA number is the first or last field. If it is not, the variable "left string" is set to all of the digits to the left of the ABA field and the variable "right string" is set to all of the digits to the right of the ABA field at 176. At 178 it is determined whether the check number is known. If it is, the check number is compared to both strings at 180 and it is determined at 182 whether either string is the check number. If neither is the check number, the START_OVER flag is set at 184 and the process is returned to 34 in FIG. 1. If it is determined at 182 that one of the strings is the check number, the account number is set to the other string at 186. The validate check length function is then called at 188. This function is described in detail below with reference to FIG. 11.

If it is determined at 178 that the check number is not known, the Echeck server is called at 190 to obtain the valid lengths of a checking account number for the present ABA number. At 192 it is determined whether either the left string or the right string has the correct number of digits. If one of the strings does have the correct number of digits, that string is taken to be the account number at 194 and the validate check length function is called at 196. This function is described in detail below with reference to FIG. 11.

If neither the left string nor the right string have the correct number of digits as determined at 192, it is determined at 198 whether both strings are less than or equal to, or greater than, six digits in length. If yes, the flag ASK_FOR_CHECK_NO is set at 200 and the process returns to 170 in FIG. 1. If no, the account number is taken to be the longer string at 202 and the validate check length function is called at 204. This function is described in detail below with reference to FIG. 11.

If it is determined at 174 that the ABA number is either the first or the last field, a different processing routine for more than three fields is called at 206. This routine is outlined in FIG. 10. The functions of FIG. 9 can be found in the code at try_combining.

Figure 10:
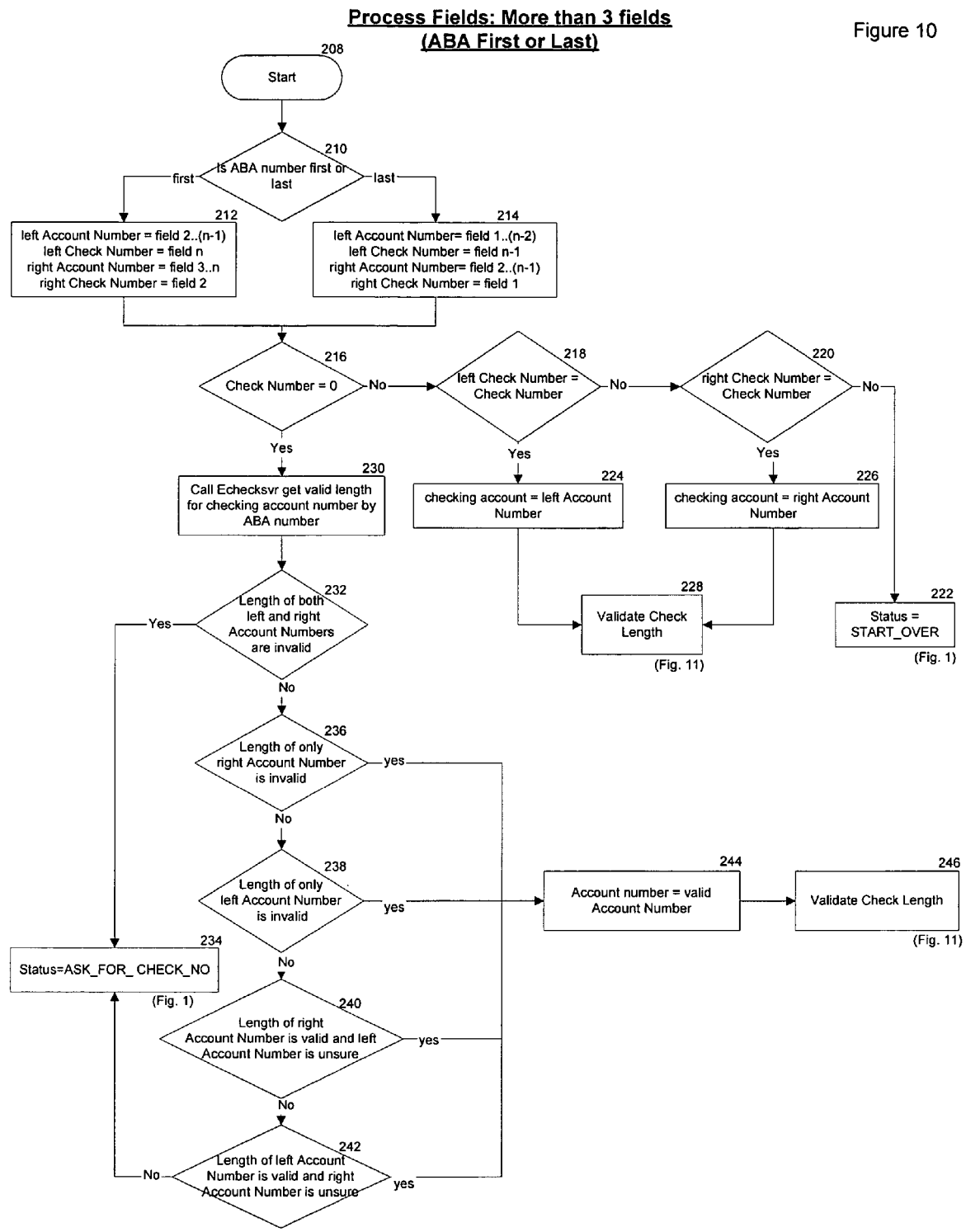
FIG. 10 is a high level flow chart illustrating a sub-routine for processing checking account numbers having more than three fields where the ABA number is the first or last field.

Turning now to FIG. 10, starting at 208, it is determined at 210 whether the ABA number is the first field or the last field. If it is the first field, the following variables are set at 212: "left account number" is set to all of the digits in the second field through the next to last field, "left check number" is set to the last field, "right account number" is set to all of the digits in the third field through the last field, and "right check number" is set to the second field.

If it is determined at 210 that the ABA number is the last field, the following variables are set at 214: "left account number" is set to all of the digits in the first field through the second from the last field, "left check number" is set to the next to the last field, "right account number" is set to all of the digits in the second field through the next to the last field, and "right check number" is set to the first field.

After these variables are set, it is determined at 216 whether the check number is known. If it is, the variable "left check number" is compared to the known check number at 218. If they are not the same, the variable "right check number" is compared to the known check number at 220. If these don't match, the flag START_OVER is set at 222 and the process returns to the start at 10 in FIG. 1.

If it is determined at 218 that the variable "left check number" is the correct check number, the variable "left account number" is taken to be the checking account number at 224. If it is determined at 220 that the variable "right check number" is the correct check number, the variable "right account number" is taken to be the checking account number at 226. The validate check length routine is then called at 228.

If it is determined at 216 that the check number is not known, the Echeck server is called at 230 to determine the correct number of digits for the account number based on the current ABA number. If it is determined at 232 that both variables "left account number" and "right account number" have the incorrect number of digits, the flag ASK_FOR_CHECK_NO is set at 234 and the process returns to 170 in FIG. 1. Otherwise, if it is determined at 236, 238, 240, or 242 that one of the variables has the correct number of digits and the other doesn't or is unsure, the account number is taken at 244 to be the variable with the correct number of digits and the validate check length function is called at 246. (Correct field length is based on accumulated knowledge related to each ABA number. If insufficient knowledge exists for the ABA in question, field length can be considered "unsure".) If it is determined at 236, 238, 240, or 242 that neither of the variables has the correct number of digits, the flag ASK_FOR_CHECK_NO is set at 234 and the process returns to 170 in FIG. 1. The functions of FIG. 10 can be found in the code at "try combining".

Figure 11:
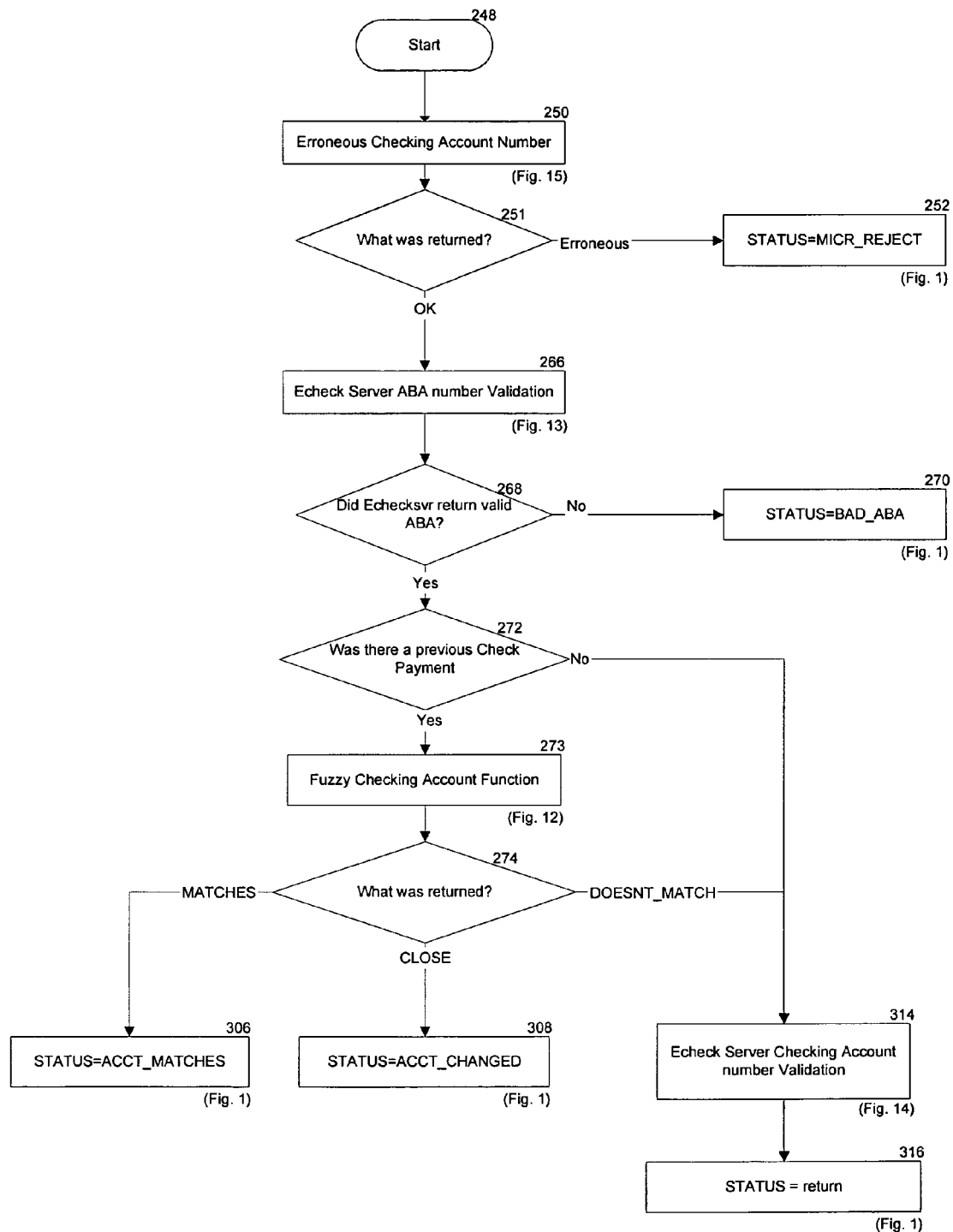
FIG. 11 is a high level flow chart illustrating a sub-routine for validating the numbers parsed from the MICR line.

The validate check length function begins at 248 in FIG. 11 by calling the erroneous check account number function at 250. This function is described in detail below with reference to FIG. 15. If it is determined at 251 that the checking account number is clearly erroneous the flag MICR_REJECT is set at 252 and the process returns to FIG. 1 where a MICR Validation handler is called at 254. This handler is outlined in FIG. 2. The functions of FIGS. 11 and 15 can be found in the code at crazy_accounts, check_lengths, and fuzzy_accounts. Generally, an account number is clearly erroneous if the entire checking account number is ascending; 123456789, 003456789; the entire account is descending 987654321, 00654321; the account number contains more than 75% of the same digits when the account number is greater than 7 digits in length; 144444; the account code contains more than 60% of the same digit and the length is less than or equal to 7 digits in length.

Figure 2:
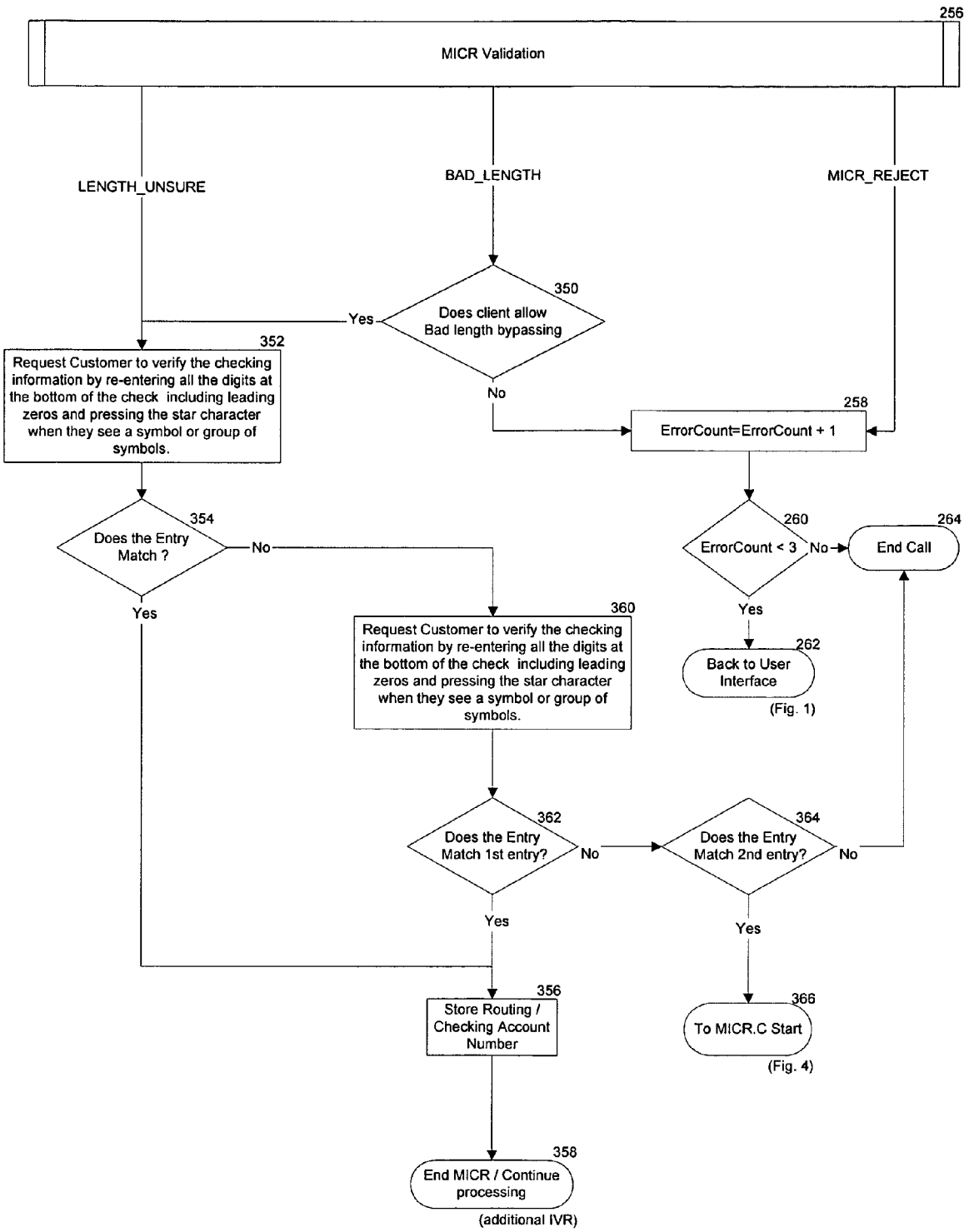
FIG. 2 is a high level flow chart illustrating a sub-routine for handling MICR problems.

Referring now to FIG. 2, the MICR Validation handler begins at 256 and in the case of a MICR_REJECT flag being set, increments ErrorCount at 258. If the error count is less than three as determined at 260, the process returns at 262 to start over at 10 in FIG. 1. When the error count reaches three, the call is ended at 264.

Returning to FIG. 11, if the account number is not clearly erroneous as determined at 251, the Echeck server ABA number Validation function is called at 266. This function is outlined in FIG. 13 which was described above. The result of the ABA number Validation function is checked at 268. If the BAD_ABA flag was set, the handler of FIG. 4 is called at 270. If the function returned a VALID flag for the ABA number, it is determined at 272 whether this customer made a previous payment with this account. (See FIG. 18 and description below.) If there was a previous payment, the Fuzzy Checking Account function is called at 273. This function is outlined in FIG. 12.

Figure 12:
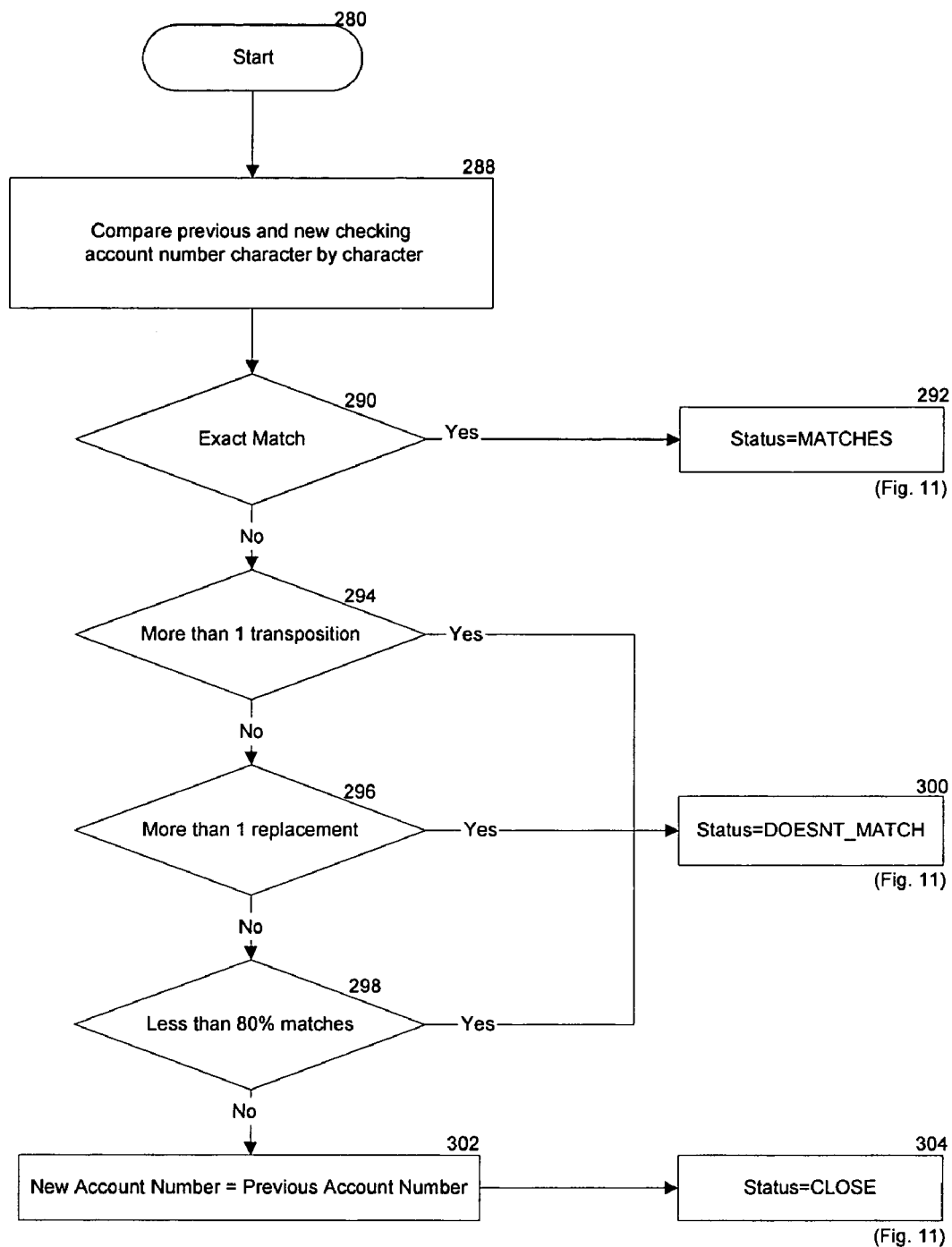
FIG. 12 is a high level flow chart illustrating a sub-routine for matching checking account numbers.

Turning now to FIG. 12, starting at 280, the previous and new checking account numbers are compared digit by digit at 288. If there is an exact match as determined at 290, a flag is set to MATCHES at 292 and the process returns to FIG. 11. If there is more than one transposition as determined at 294 or more than one replacement as determined at 296 or if less than 80% match as determined at 298, the flag is set to DOESN'T_MATCH at 300 and the process returns to FIG. 11. Otherwise, the new account number is assumed to be the old account number at 302, the flag is set to CLOSE at 304 and the process returns to FIG. 11.

Referring now to FIGS. 11 and 1, the results of the fuzzy checking account function are analyzed at 274. In the case of the flag being set to MATCHES or CLOSE, the routine ends at 306 or 308 respectively and returns to 310 in FIG.

1 where the routing number and checking account number are stored at 310 and other processing continues at 312. Other processing may include entering an amount for the check, selecting from a list of payees, etc.

Finishing with FIG. 11, if it is determined at 272 that there was no previous payment or if the Fuzzy Checking Account function sets the flag to DOESN'T_MATCH at 274, the Echeck server Checking Account number Validation function is called at 314 before returning to FIG. 1 at 316.

Figure 14:
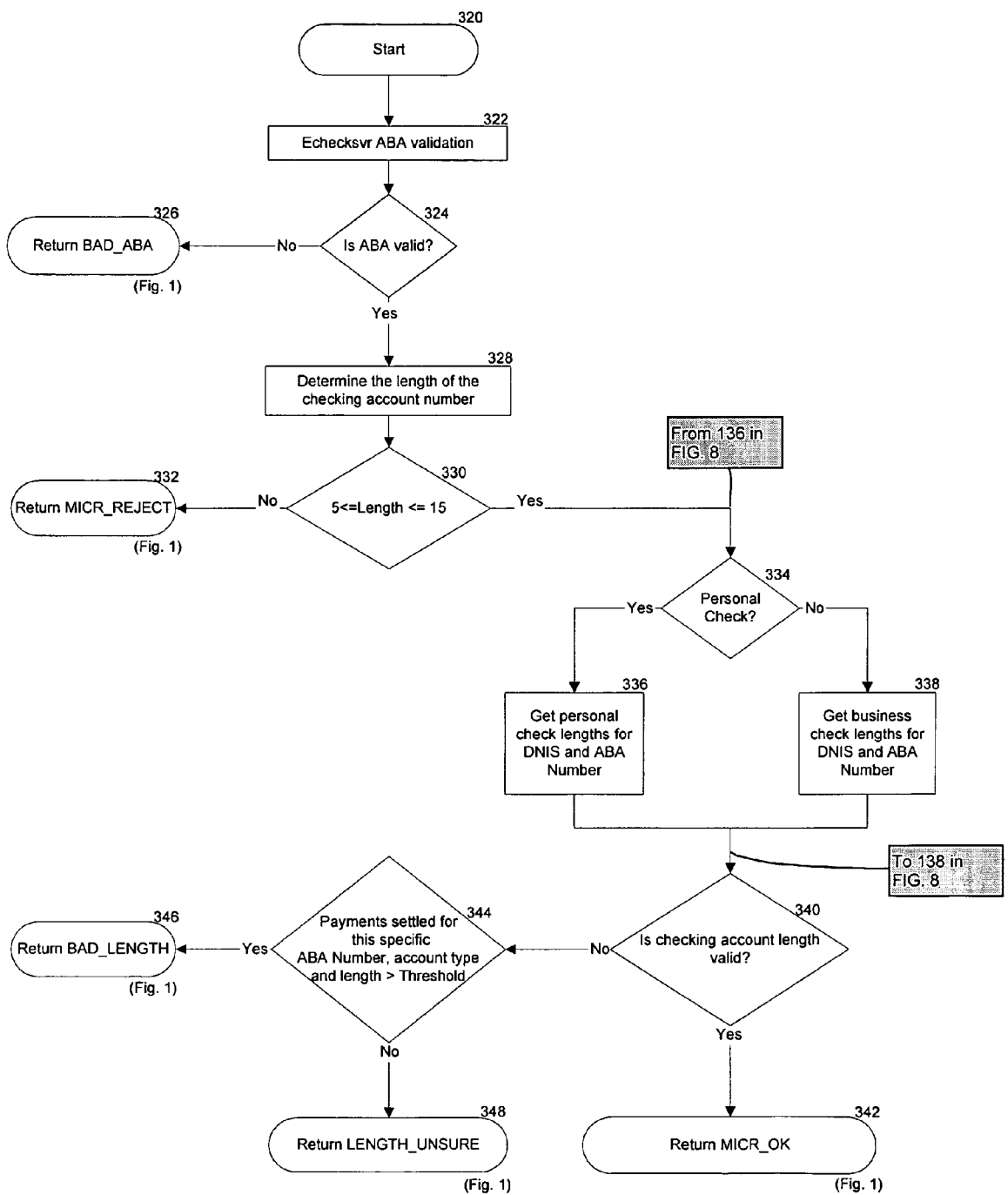
FIG. 14 is a high level flow chart illustrating a sub-routine for validating checking account numbers.

The Echeck server Checking Account number Validation function is outlined in FIG. 14. Starting at 320, the Echeck server ABA validation routine is called at 322. This function is outlined in FIG. 13 described above. If it is determined at 324 that the ABA number is invalid, the BAD_ABA flag is set at 326 and the process resumes at 34 in FIG. 1. If the ABA number is valid, the length of the checking account number is determined at 328. If the length is not between five and fifteen as determined at 330, the flag REJECT is set at 332 and the routine returns to 254 in FIG. 1 If the account number has the correct number of digits as determined at 330, it is determined at 334 whether the account is a personal account or a business account. The appropriate account number length(s) for a personal account based on DNIS and ABA is obtained at 336. DNIS is a unique number assigned to each client (payee) so that information obtained when processing payments for one client is not used to process payments for another client. This is provided in order to satisfy contractual obligations that all data relating to a client is kept strictly confidential.

The appropriate length(s) for a business account is obtained at 338. This is obtained from a database which matches ABA numbers with correct account number lengths. The database is built over time based on successful payments. It is then determined at 340 whether the present account number is a correct length. If it is, the flag MICR_OK is set at 342 and the routine returns to 480 in FIG. 1. There, the customer is prompted to verify the entry. The customer's input is evaluated at 490. If the customer did not verify, the process is returned at 495 to start over. If the input is verified at 490, the information is stored at 310 and additional IVR processing is continued at 312.

When entering FIG. 14 from 136 in FIG. 8, the process begins at 334 and exits back to 138 in FIG. 8 before entering 340.

If the checking account number length is not correct, a determination is made at 344 whether this ABA number, account type and length have been associated with a threshold number of successful payments. The presently preferred threshold is fifty. If yes, the flag BAD_LENGTH is set at 346. If no, the flag LENGTH_UNSURE is set at 348. In either case, the process continues as outlined in FIG. 2.

In the case of BAD_LENGTH, the process continues at 350 in FIG. 2 where it is determined whether bad length bypassing is allowed. There are three reasons why bad length bypassing should be allowed. The first is when the database of correct lengths is in the process of being created. The second is where the bank is changing the length of account numbers, e.g. when two banks merge. The third is if the database was created without leading zeros. If it is not, the error count is incremented at 258 and the previously described routine at 260–264 is followed. If bad length bypassing is allowed or if the flag LENGTH_UNSURE was set, processing continues at 352 where the customer is prompted to re-enter the numbers from the bottom of the check. The re-entry is compared to the original entry at 354 and if they match, the routing number and checking account number are stored at 356 and additional processing continues at 358. Such additional processing may include check amount, payee selection, etc. If the re-entered number does not match the first entered number, the customer is prompted at 360 to re-enter the number a third time. If the third entry matches the first as determined at 362, the routing number and checking account number are stored at 356 and additional processing continues at 358. If not, the third entry is compared to the second entry at 364. If there is still no match, the call is ended at 264. If the second and third entries match, processing continues at 366 to return to 24 in FIG. 4.

Figure 15:
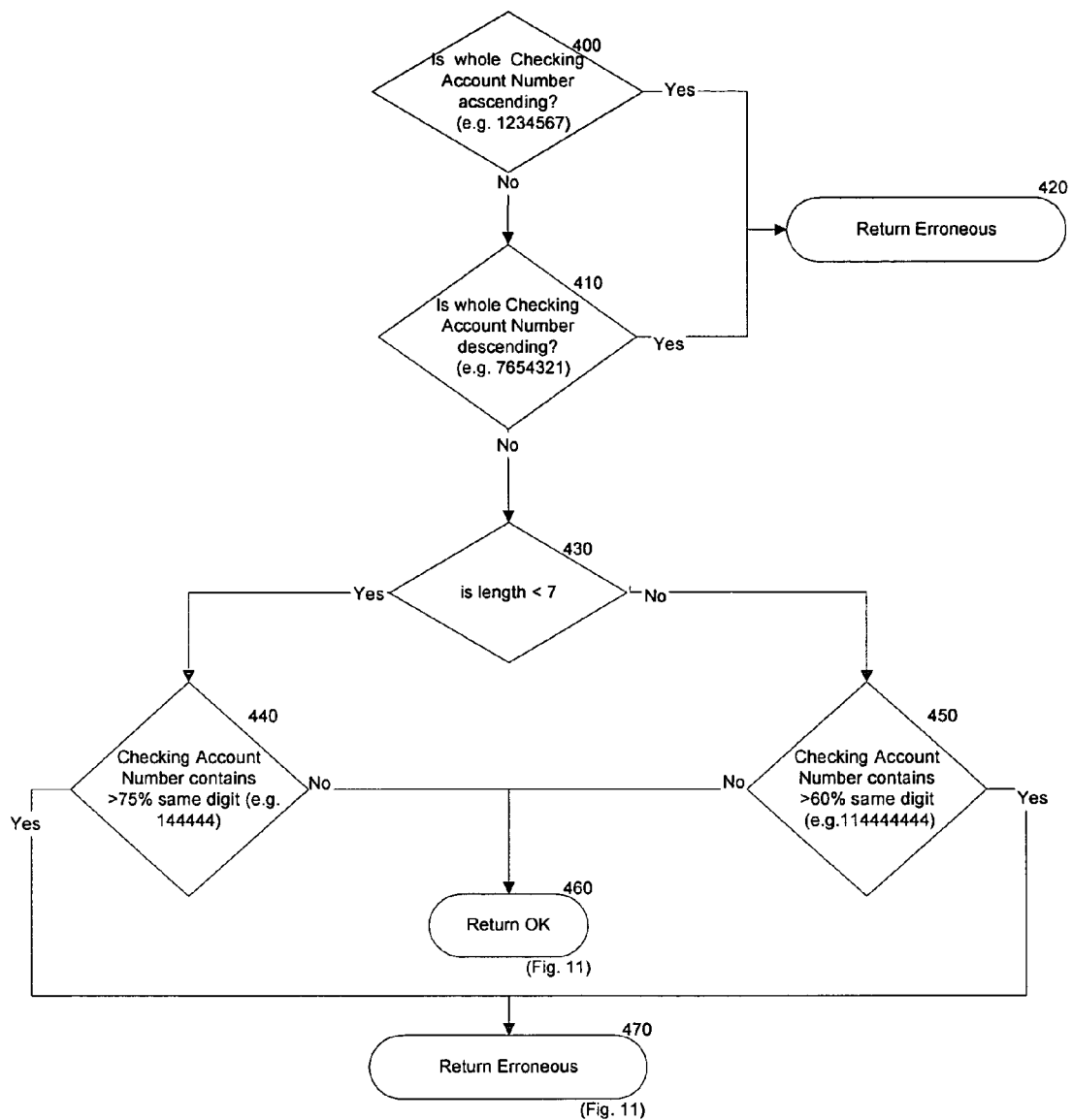
FIG. 15 is a high level flow chart illustrating a sub-routine for determining an erroneous checking account number.

Turning now to FIG. 15, a routine for determining a clearly erroneous checking account number is illustrated. If it is determined at 400 or 410 that the account number is a string of ascending or descending digits, the erroneous flag is set at 420. If these tests fail, it is determined at 430 whether the length of the account number is less than seven digits. If it is less than seven digits, it is determined at 440 whether 75% of the digits are the same. If it is not less than seven digits, it is determined at 450 whether 60% of the digits are the same. If the test at 440 or 450 fails, the account number is not clearly erroneous and the function returns to FIG. 11 at 460. If either of these tests pass, the number is clearly erroneous and the function returns to FIG. 11 at 470.

Figure 16:
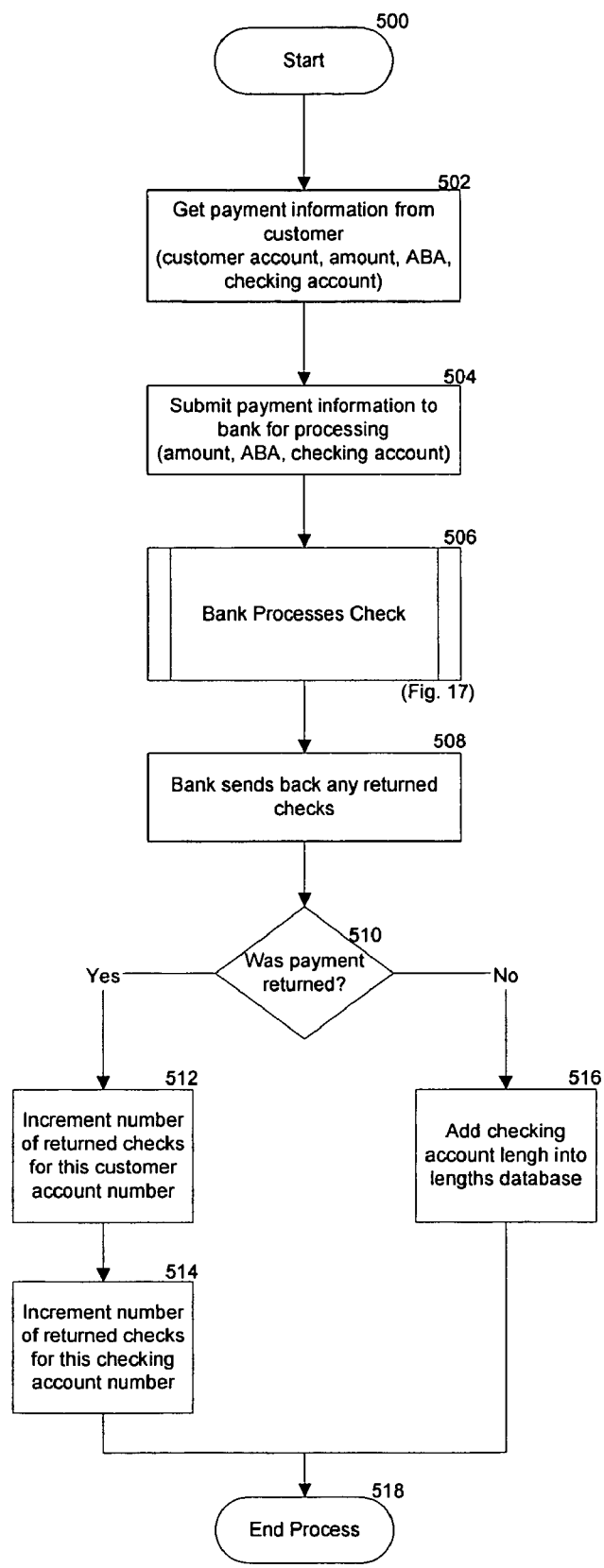
FIG. 16 is a high level flow chart illustrating a sub-routine for payment processing.
Figure 17:
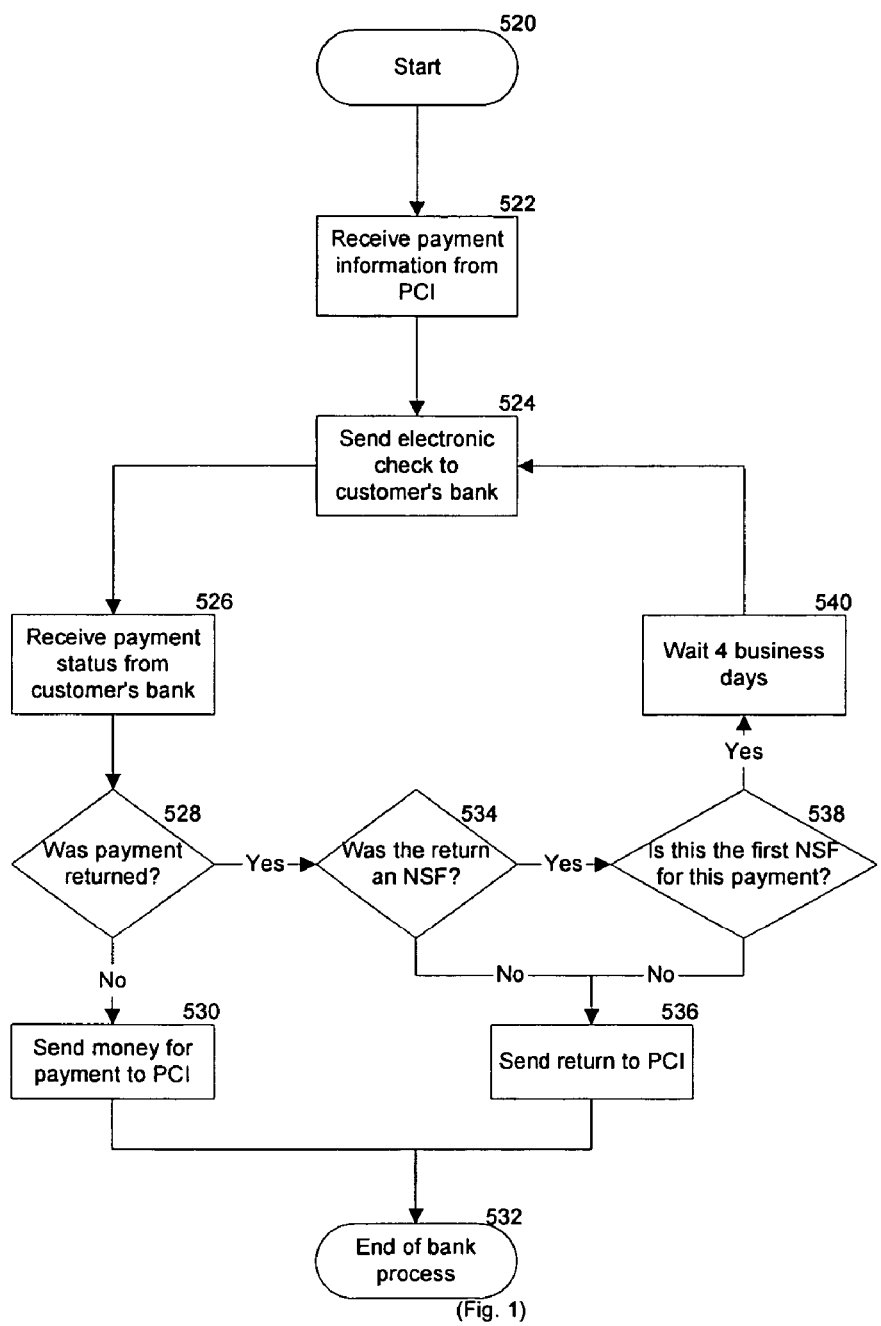
FIG. 17 is a high level flow chart illustrating a sub-routine for bank processing.

After the payment information is obtained from the customer, it is presented to the customer's bank for payment. This process is illustrated in FIG. 16. Starting at 500, the previously obtained payment information is assembled at 502 and is submitted to the bank at 504. The bank then processes the check at 506. This processing by the bank is illustrated in FIG. 17 described below. If the bank returns the check at 508, this is determined at 510. If the check is not returned, the account length information is added to the database at 516 and the process ends at 518. If the check is returned, the database is updated at 512 and 514 to indicate the number of returned checks for this customer and this account number. Then the process ends at 518.

The bank processing of an echeck is outlined in FIG. 17. Starting at 520, the payment information is received at 522 by an echeck processing bank which forwards the echeck to the customer's bank at 524. The customer's bank returns the status of the check at 526. If the check clears, the bill is paid at 530 and the process ends at 532. If it is determined at 528 that the payment was returned, it is determined at 534 whether the reason was insufficient funds. If it is not because of insufficient funds, e.g. bad account number, the check is simply returned at 536 and the process ends at 532. If the reason was insufficient funds, it is determined at 538 whether the check has been submitted twice for payment. If not, the check is presented again four days later at 540. Otherwise the check is returned at 536.

Figure 18:
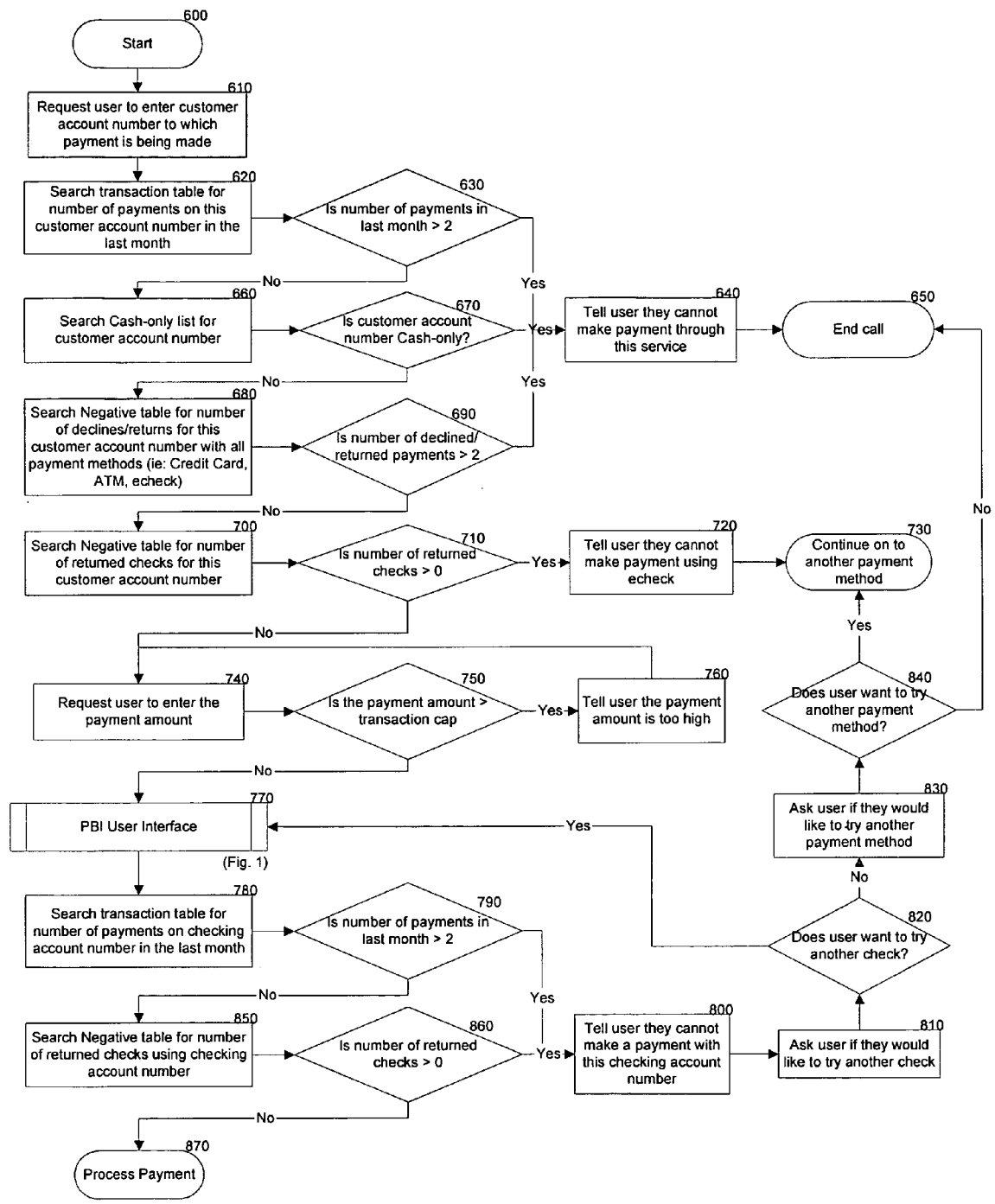
FIG. 18 is a high level flow chart illustrating an interactive payment system within which the invention is implemented.
Figure 20:
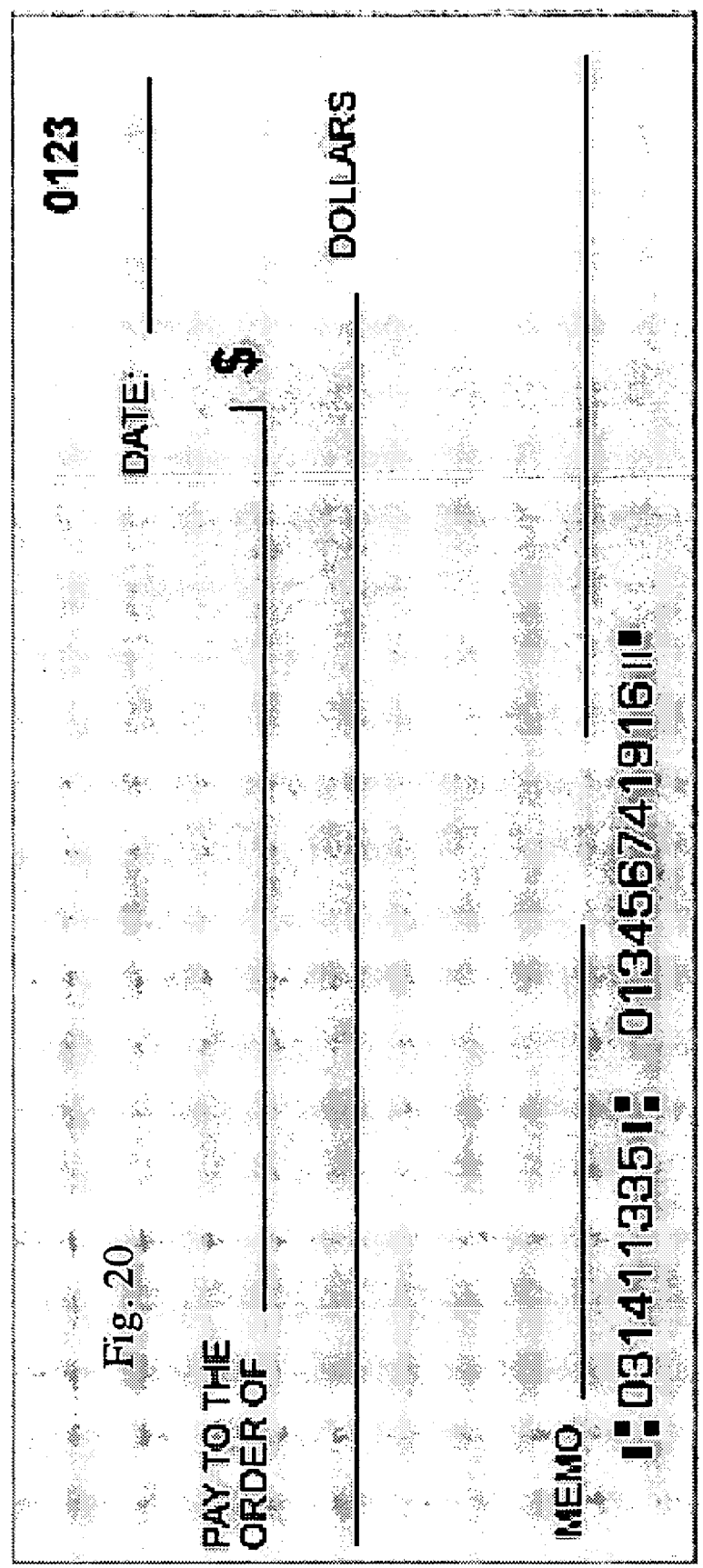
Figure 21:
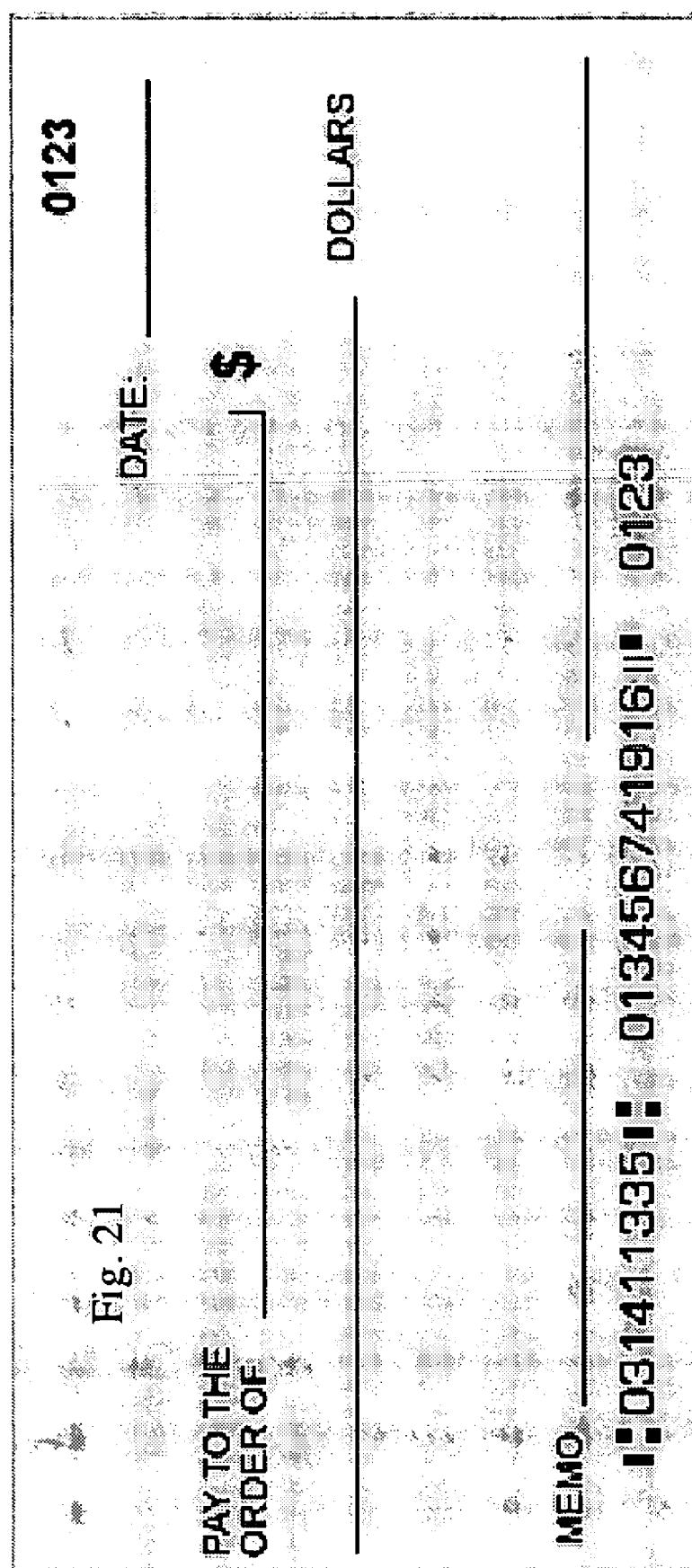

FIG. 18 illustrates an exemplary IVR system within which the invention is applied. Starting at 600, the customer is prompted at 610 to enter the account number of the payee. At 620, the account number and customer number are compared for payments made within the last month. If it is determined at 630 that the number of payments in the last month exceeds two, the customer is prompted at 640 that no additional payments can be made and the call is ended at 650. Next, at 660–670, it is determined whether the customer account is on a cash-only list. If it is, the customer is prompted at 640 that no payments can be made and the call is ended at 650. Next, at 680–690, it is determined whether this customer has had more than two bad payments (e.g. returned checks or declined credit card charges). If that is the case, the customer is prompted at 640 that no payments can be made and the call is ended at 650. Next it is determined at 700–710 whether the customer has had any returned checks. If yes, the customer is prompted at 720 that payment cannot be made with echeck and processing continues with an alternate form of payment (e.g. credit card) at 730.

If all of the above tests are passed, the customer is prompted at 740 to enter the payment amount and it is determined at 750 whether that amount exceeds a transaction cap. If the amount is too high, the customer is so prompted at 760 and a loop is entered which doesn't end until the customer enters an acceptable amount. Though not shown in the Figure, a counter can be set to exit the loop and end the call after several failures. When the customer enters an appropriate amount, the invention described above is invoked at 770 starting with FIG. 1. When the processing described above with reference to FIGS. 1–15 is complete, the IVR continues at 780 where it is determined how many payments the customer has made with this checking account in the last month. If it is determined at 790 that the number is more than two, the user is prompted at 800 that payment cannot be made with this checking account and is prompted at 810 whether the customer wants to use a different checking account. If it is determine at 820 that the customer wants to use a different account, the process resumes at 770. If not, the user is prompted at 830 whether a different payment method is desired. If not as determined at 840, the call is ended at 650. If yes, the other payment processing is entered at 730.

If it was determined at 790 that fewer than two payments were made with this checking account, it is then determined at 850–860 whether this checking account has had any checks returned. If yes, the steps at 800–840, described above, are followed. If not, the payment is processed at 870.

Those skilled in the art will appreciate that the invention relies on several databases, in particular, a "transaction" database, a "negative" database, and a "length" database. The transaction database includes a list of all transactions made through the system. Each transaction includes customer account number, ABA, checking account number, payment amount, etc. The negative database includes a list of all customer account numbers and checking account numbers that have had declines or returns. Each record includes the customer account number or checking account number and the number of declines/returns on that number. The length database includes a list of all valid checking account number lengths associated with non-returned payments through this system. Each record includes DNIS, ABA, number of payments to the ABA for personal checks, number of payments to the ABA for business checks, a list of the personal lengths associated with the ABA, a list of the business lengths associated with the ABA.

According to the presently preferred embodiment, two counts are stored per ABA number: the number of successful payments for personal checks and the number of successful payments for business check. When determining if a given length is "valid", "invalid", or "unsure", the number of payments is compared to the threshold (currently 50). If the number of payments is below this threshold, then the length is unsure if it is not in the lengths database. This process will be enhanced by including counts by each length. It will then be possible to determine if the length should be considered valid or unsure based on how many times that given length has been used for a successful payment. For example, if a length of 7 is given for ABA 338922833 and the length database has the following: number of valid 7 digit payments=2 and total number of payments to ABA 338922833=3000, it cannot be certainly determined that a length of 7 is valid due to the fact that 2 is such a small percentage of 3000. In this case, the process would return unsure.

The methods of the invention may be applied in instances where no parsing of account data is necessary, i.e. where the customer parses the data before inputting it to the system. In addition, customer data may be obtained in ways other than directly from a user. For example, data from multiple users may be collected outside of the system, by a payee or a bank, and presented to the system in the form of a batch file. Data may also be presented in paper form which must be scanned or manually input into the system. In cases where no parsing is performed, the determination of account validity can still be performed using valid account number lengths associated with ABA numbers. Also, the fuzzy logic techniques of the invention can be applied independently of parsing and account number length validation.

There have been described and illustrated herein methods and apparatus for processing electronic checks. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as so claimed.

What is claimed is:

1. A method, comprising:
   receiving account data;
   parsing the account data to determine a bank routing number, wherein
   the account data includes MICR line data;
   comparing the bank routing number to a previously submitted bank routing number, wherein the previously submitted bank routing number is associated with a successful payment;
   determining if there has been a transposition of a first digit of the parsed bank routing number with a second digit of the parsed bank routing number; and
   upon determining that one transposition exists, automatically replacing the parsed bank routing number with the previously submitted bank routing number.

2. The method according to claim 1, wherein:
   the account data includes at least one non-numeric character.

3. The method according to claim 1, wherein:
   the step of parsing includes separating the account data into fields based on the placement of at least one non-numeric character.

4. The method according to claim 3, wherein:
   the step of parsing further includes counting the number of digits in each field of account data to determine a likely routing number field and a likely account number field.

5. The method according to claim 4, wherein:
   the step of parsing further includes comparing the number of digits in the likely account number field to a predetermined number of valid digits for account numbers associated with the routing number in the likely routing number field.

6. A method, comprising:
   receiving account data;
   parsing the account data to determine a bank routing number, wherein
   comparing the parsed bank routing number to a previously submitted bank routing number, wherein the previously submitted bank routing number is associated with a successful payment;
determining if the number of digits in the parsed bank routing number and the previously submitted bank routing number differ by no more than one; and
upon determining that the number of digits in the parsed bank routing number and the previously submitted bank routing number differ by no more than one, automatically replacing the parsed bank routing number with the previously submitted bank routing number.

7. The method according to claim 6, wherein:
said step of parsing includes determining a correct number of account number digits based on the bank routing number; and
said step of determining the correct number of account number digits is based on a history of successful payments associated with the bank routing number.

8. The method according to claim 6, wherein:
said step of determining the correct number of account number digits is based in part on fuzzy logic.

9. The method according to claim 6, wherein:
said step of parsing includes comparing the bank routing number to a list of valid bank routing numbers.

10. The method according to claim 6, wherein:
said step of parsing includes dividing the account data into fields.

11. A method, comprising:
receiving account data;
parsing the account data to determine a bank routing number
comparing the parsed bank routing number to a previously submitted bank routing number, wherein the previously submitted bank routing number is associated with a successful payment;
determining if more than a preset percentage of the string of digits of the parsed bank routing number and the string of digits of the previously submitted bank routing number match; and
upon determining that more than a preset percentage of the string of digits of the parsed bank routing number and the string of digits of the previously submitted bank routing number match, automatically replacing the parsed bank routing number with the previously submitted bank routing number.

12. The method according to claim 11, wherein:
said step of parsing includes at least one database lookup.

13. The method according to claim 12, wherein:
said database includes a database of valid bank routing numbers.

14. The method according to claim 12, wherein:
said step of parsing includes parsing out an account number; and
said database includes a database of valid account number lengths associated with the bank routing number.

15. The method according to claim 11, wherein:
said step of parsing includes parsing out a check number.

16. A method, comprising:
receiving account data;
parsing the account data to determine a bank routing number, wherein
said step of parsing is performed without separating the account data into fields based on the placement of at least one non-numeric character;
comparing the parsed bank routing number to a previously submitted bank routing number, wherein the previously submitted bank routing number is associated with a successful payment;
determining if the number of digits in the parsed bank routing number and the previously submitted bank routing number differ by no more than one; and
upon determining that the number of digits in the parsed bank routing number and the previously submitted bank routing number differ by no more than one, automatically replacing the parsed bank routing number with the previously submitted bank routing number.

17. The method according to claim 16, wherein:
said step of parsing includes the application of fuzzy logic.

18. The method according to claim 16, wherein:
said step of parsing includes at least one database lookup.

19. The method according to claim 18, wherein:
the database includes a database of valid bank routing numbers.

20. The method according to claim 18, wherein:
said step of parsing includes parsing out an account number; and
the database includes a database of valid account number lengths associated with the bank routing number.

21. An apparatus, comprising:
means for receiving account data;
means for parsing the account data to determine the bank routing number, wherein
the account data is the MICR line data
means for comparing the parsed bank routing number to a previously submitted bank routing number, wherein the previously submitted bank routing number is associated with a successful payment;
means for determining if there has been a transposition of a first digit of the parsed bank routing number with a second digit of the parsed bank routing number; and
means for automatically replacing the parsed bank routing number with the previously submitted bank routing number upon determining that one transposition exists.

22. The apparatus according to claim 21, wherein:
the account data includes at least one non-numeric character.

23. The apparatus according to claim 21, wherein:
said means for parsing includes means for separating the account data into fields based on the placement of at least one non-numeric characters.

24. The apparatus according to claim 23, wherein:
said means for parsing includes means for counting the number of digits in each field of account data to determine a likely routing number field and a likely account number field.

25. The apparatus according to claim 24, wherein:
said means for parsing includes means for comparing the number of digits in the likely account number field to a predetermined number of valid digits for account numbers associated with the routing number in the likely routing number field.

26. An apparatus, comprising:
means for receiving account data;
means for parsing the account data to determine a bank routing number, wherein
means for comparing the parsed bank routing number to a previously submitted bank routing number, wherein the previously submitted bank routing number is associated with a successful payment;
means for determining if the number of digits in the parsed bank routing number and the previously submitted bank routing number differ by no more than one; and means for automatically replacing the parsed bank routing number with the previously submitted bank routing number, upon determining that the number of digits in the parsed bank routing number and the previously submitted bank routing number differ by no more than one.

27. The apparatus according to claim 26, wherein:
said step of parsing includes determining a correct number of account number digits based on the bank routing number; and
said means for determining the correct number of digits is based on a history of successful payments associated with the bank routing number.

28. The apparatus according to claim 26, wherein:
said means for determining the correct number of digits is based in part on fuzzy logic.

29. The apparatus according to claim 26, wherein:
said means for parsing includes means for comparing the bank routing number to a list of valid bank routing numbers.

30. The apparatus according to claim 26, wherein:
said means for parsing includes means for dividing the account data input into fields.

31. An apparatus, comprising:
means for receiving account data; and
means for parsing the account data to determine a bank routing number
means for comparing the parsed bank routing number to a previously submitted bank routing number, wherein the previously submitted bank routing number is associated with a successful payment;
means for determining if more than a preset percentage of the string of digits of the parsed bank routing number and the string of digits of the previously submitted bank routing number match; and
means for automatically replacing the parsed bank routing number with the previously submitted bank routing number upon determining that more than a preset percentage of the string of digits of the parsed bank routing number and the string of digits of the previously submitted bank routing number match.

32. The apparatus according to claim 31, wherein:
said means for parsing includes at least one database lookup means.

33. The apparatus according to claim 32, wherein:
said database includes a database of valid bank routing numbers.

34. The apparatus according to claim 32, wherein:
said step of parsing includes parsing out an account number; and
said database includes a database of valid account number lengths associated with the bank routing number.

35. The apparatus according to claim 31, wherein:
means for parsing includes means for parsing out a check number.

36. An apparatus, comprising:
means for receiving account data;
means for parsing the account data to determine a bank routing number, wherein
said means for parsing operates without separating the account data into fields based on the placement of at least one non-numeric character;
means for comparing the parsed bank routing number to a previously submitted bank routing number, wherein the previously submitted bank routing number is associated with a successful payment;
means for determining if the number of digits in the parsed bank routing number and the previously submitted bank routing number differ by no more than one; and
means for automatically replacing the parsed bank routing number with the previously submitted bank routing number upon determining that the number of digits in the parsed bank routing number and the previously submitted bank routing number differ by no more than one.

37. The apparatus according to claim 36, wherein:
said means for parsing includes fuzzy logic.

38. The apparatus according to claim 36, wherein:
said means for parsing includes at least one database lookup means.

39. The apparatus according to claim 38, wherein:
the database includes a database of valid bank routing numbers.

40. The apparatus according to claim 38, wherein:
the database includes a database of valid account number lengths associated with the bank routing number.

41. A method, comprising:
receiving account data including an account number and a bank routing number;
determining the number of digits in the account number as being the length of the account number;
comparing the account number to a previously submitted account number, wherein the previously submitted account number is associated with a successful payment;
determining if the number of digits in the account number and the previously submitted account number differ by no more than one; and
upon determining that the number of digits in the account number and the previously submitted account number differ by no more than one, automatically replacing the account number with the previously submitted account number.

42. The method according to claim 41, further comprising:
indicating the account number as invalid when the length of the account number is not a valid length.

43. An apparatus, comprising:
input means for receiving account data including an account number and a bank routing number;
means for determining the number of digits in the account number as being the length of the account number;
means for comparing the account number to a previously submitted account number, wherein the previously submitted account number is associated with a successful payment;
means for determining if the number of digits in the account number and the previously submitted account number differ by no more than one; and
means for automatically replacing the account number with the previously submitted account number upon determining that the number of digits in the account number and the previously submitted account number differ by no more than one.

44. The apparatus according to claim 43, further comprising:
means for indicating the account number as invalid when the length of the account number is not a valid length.

45. An apparatus, comprising:
an input adapted to receive account data including an account number and a bank routing number;

a digit counter adapted to count the number of digits in the account number and indicate the number as being the length of the account number;

means for comparing the account number to a previously submitted account number, wherein the previously submitted account number is associated with a successful payment;

means for determining if the number of digits in the account number and the previously submitted account number differ by no more than one; and means for automatically replacing the account number with the previously submitted account number upon determining that the number of digits in the account number and the previously submitted account number differ by no more than one.

46. An apparatus according to claim 45, further comprising:

an indicator adapted to indicate the account number as invalid when the length of the account number is not a valid length.

47. A method, comprising:

receiving account data including an account number and a bank routing number;

comparing the account number to a previously submitted account number, wherein the previously submitted account number is associated with a successful payment;

determining if more than a preset percentage of the string of digits of the account number and the string of digits of the previously submitted account number match; and upon determining that more than a preset percentage of the string of digits of the account number and the string of digits of the previously submitted account number match, automatically replacing the account number with the previously submitted account number.

48. An apparatus, comprising:

input means for receiving account data including an account number and a bank routing number;

means for comparing the account number to a previously submitted account number, wherein the previously submitted account number is associated with a successful payment;

means for determining if more than a preset percentage of the string of digits of the account number and the string of digits of the previously submitted account number match: and means for automatically replacing the account number with the previously submitted account number upon determining that more than a preset percentage of the string of digits of the account number and the string of digits of the previously submitted account number match.

49. An apparatus, comprising:

an input adapted to receive account data including an account number and a bank routing number;

means for comparing the account number to a previously submitted account number, wherein the previously submitted account number is associated with a successful payment;

means for determining if there is no more than one digit of the account number different than the previously submitted account number; and means for automatically replacing the account number with the previously submitted account number upon determining that there is no more than one digit of the account number different than the previously submitted account number.

* * * * *